US012802575B2

(12) United States Patent
Luckey et al.

(10) Patent No.: US 12,802,575 B2
(45) Date of Patent: Nov. 17, 2026

(54) RUGGEDIZED AUTONOMOUS HELICOPTER PLATFORM

(71) Applicant: Anduril Industries, Inc., Costa Mesa, CA (US)

(72) Inventors: Palmer F. Luckey, Newport Beach, CA (US); Julian Hammerstein, Murrieta, CA (US); Joseph Chen, Irvine, CA (US)

(73) Assignee: Anduril Industries, Inc., Costa Mesa, CA (US)

( * ) Notice: Subject to any disclaimer, the term of this patent is extended or adjusted under 35 U.S.C. 154(b) by 31 days.

(21) Appl. No.: 18/937,283

(22) Filed: Nov. 5, 2024

(65) Prior Publication Data

US 2026/0134780 A1 May 14, 2026

Related U.S. Application Data

(63) Continuation of application No. 18/204,529, filed on Jun. 1, 2023, now Pat. No. 12,170,028, which is a (Continued)

(51) Int. Cl.
*G05D 1/02* (2020.01)
*B64C 25/10* (2006.01)
(Continued)

(52) U.S. Cl.
CPC ............... *G08G 5/32* (2025.01); *B64C 25/10* (2013.01); *B64C 25/32* (2013.01); *B64U 50/19* (2023.01);
(Continued)

(58) Field of Classification Search
CPC .. G08G 5/0034; G08G 5/0069; G08G 5/0013; G08G 5/0021; G08G 5/0039;
(Continued)

(56) References Cited

U.S. PATENT DOCUMENTS

| | | | |
|---|---|---|---|
| 2,861,640 | A | 11/1958 | Stephen |
| 3,463,398 | A | 8/1969 | Smith |

(Continued)

FOREIGN PATENT DOCUMENTS

| | | |
|---|---|---|
| CN | 205418074 | 8/2016 |
| CN | 106828886 | 6/2017 |

(Continued)

OTHER PUBLICATIONS

Bhandari et al. "Search and rescue using unmanned aerial vehicles." AIAA InfotechAerospace Conference 2015, Dec. 31, 2015, pp. 1042-1052.

(Continued)

*Primary Examiner* — Masud Ahmed

(74) *Attorney, Agent, or Firm* — Knobbe, Martens, Olson & Bear, LLP

(57) ABSTRACT

A system comprises an interface, a processor, and a memory. The interface is configured to receive a command to find a stationary location to continue surveillance using an unmanned helicopter. The processor is configured to determine whether the unmanned helicopter is to stay outside a current field of view of an object and in response to determining that the unmanned helicopter is to stay outside the current field of view of the object, determine a suitable location outside the current field of view and a route to the suitable location. The memory coupled to the processor and configured to provide the processor with instructions.

18 Claims, 21 Drawing Sheets

Related U.S. Application Data continuation of application No. 17/853,366, filed on Jun. 29, 2022, now Pat. No. 11,721,222, which is a continuation of application No. 16/165,470, filed on Oct. 19, 2018, now Pat. No. 11,443,640.

(51) Int. Cl.

| | |
|---|---|
| ***B64C 25/32*** | (2006.01) |
| ***B64U 50/19*** | (2023.01) |
| ***B64U 60/40*** | (2023.01) |
| ***B64U 60/50*** | (2023.01) |
| ***G08G 5/32*** | (2025.01) |
| ***G08G 5/55*** | (2025.01) |
| ***G08G 5/57*** | (2025.01) |
| *B64U 10/17* | (2023.01) |
| *B64U 30/40* | (2023.01) |
| *B64U 101/30* | (2023.01) |
| *B64U 101/64* | (2023.01) |

(52) U.S. Cl.

CPC ............. *B64U 60/40* (2023.01); *B64U 60/50* (2023.01); *G08G 5/55* (2025.01); *G08G 5/57* (2025.01); *B64C 2025/325* (2013.01); *B64U 10/17* (2023.01); *B64U 30/40* (2023.01); *B64U 2101/30* (2023.01); *B64U 2101/64* (2023.01); *B64U 2201/10* (2023.01)

(58) Field of Classification Search

CPC ...... G08G 5/0056; G08G 5/006; G08G 5/025; B64C 25/10; B64C 25/32; B64C 39/024; B64C 2025/325; B64C 2201/024; B64C 2201/042; B64C 2201/108; B64C 2201/126; B64C 2201/141; B64C 2201/165; B64C 2201/123; B64C 2201/127; B64C 2201/128; B64C 17/00

See application file for complete search history.

(56) References Cited

U.S. PATENT DOCUMENTS

| | | | | |
|---|---|---|---|---|
| 8,317,130 | B1 | 11/2012 | Westman | |
| 8,695,817 | B2 | 4/2014 | Vogel | |
| 9,026,272 | B2 * | 5/2015 | Kokkeby | G01S 3/7864 701/3 |
| 9,382,003 | B2 * | 7/2016 | Burema | B64C 39/024 |
| 9,397,745 | B2 | 7/2016 | Jalali | |
| 9,456,185 | B2 | 9/2016 | Oakley | |
| 9,781,313 | B2 | 10/2017 | Pan | |
| 9,798,324 | B2 | 10/2017 | Nevdahs | |
| 11,194,348 | B2 * | 12/2021 | Maor | A01D 46/30 |
| 11,443,640 | B2 | 9/2022 | Luckey et al. | |
| 11,721,222 | B2 | 8/2023 | Luckey et al. | |
| 12,170,028 | B2 | 12/2024 | Luckey et al. | |
| 2009/0294573 | A1 * | 12/2009 | Wilson | B64U 10/25 703/7 |
| 2010/0017114 | A1 | 1/2010 | Tehan | |
| 2014/0249693 | A1 * | 9/2014 | Stark | B64D 47/02 701/2 |
| 2015/0066248 | A1 | 3/2015 | Arbeit | |
| 2016/0117932 | A1 | 4/2016 | Park | |
| 2016/0280369 | A1 | 9/2016 | Pounds | |
| 2016/0356574 | A1 | 12/2016 | Tebay | |
| 2017/0057628 | A1 | 3/2017 | Holly | |
| 2017/0113799 | A1 * | 4/2017 | Kovac | F03D 80/50 |
| 2017/0225800 | A1 * | 8/2017 | Holt | B64C 39/024 |
| 2018/0016027 | A1 * | 1/2018 | Cheatham, III | G06Q 10/0832 |
| 2018/0244391 | A1 | 8/2018 | Curran | |
| 2018/0290725 | A1 | 10/2018 | Koessler | |
| 2018/0304996 | A1 | 10/2018 | Su | |
| 2019/0079509 | A1 | 3/2019 | Bosworth | |
| 2019/0114564 | A1 * | 4/2019 | Ferguson | G06Q 10/06312 |
| 2020/0055595 | A1 | 2/2020 | Bailie | |

FOREIGN PATENT DOCUMENTS

| | | |
|---|---|---|
| CN | 108216555 | 6/2018 |
| CN | 207725612 | 8/2018 |
| DE | 3408574 | 9/1985 |
| JP | H02287100 | 11/1990 |
| JP | H11152093 | 6/1999 |
| JP | H11278391 | 10/1999 |
| JP | 2002166893 | 6/2002 |
| JP | 2005127651 | 5/2005 |
| JP | 2007230368 | 9/2007 |
| JP | 2008308154 | 12/2008 |
| JP | 2009269493 | 11/2009 |
| JP | 2017068298 | 4/2017 |
| JP | 2018047866 | 3/2018 |
| JP | 2018511248 | 4/2018 |
| JP | 6349481 | 6/2018 |
| WO | 2017021391 | 2/2017 |
| WO | 2017027836 | 2/2017 |
| WO | 2017170148 | 10/2017 |
| WO | 2018089694 | 5/2018 |

OTHER PUBLICATIONS

Bhandari et al., "Search and rescue using unmanned aerial vehicles", AIAA Infotechaerospace Conference 2015, Kissimmee, Florida, pp. 1042-1052, XP00954335 (2015).

* cited by examiner

RUGGEDIZED AUTONOMOUS HELICOPTER PLATFORM

CROSS REFERENCE TO OTHER APPLICATIONS

This application is a continuation of U.S. patent application Ser. No. 18/204,529 entitled RUGGEDIZED AUTONOMOUS HELICOPTER PLATFORM filed Jun. 1, 2023 which is incorporated herein by reference for all purposes, which is a continuation of U.S. patent application Ser. No. 17/853,366 entitled RUGGEDIZED AUTONOMOUS HELICOPTER PLATFORM filed Jun. 29, 2022, now U.S. Pat. No. 11,721,222, which is incorporated herein by reference for all purposes, which is a continuation of U.S. patent application Ser. No. 16/165,470 entitled RUGGEDIZED AUTONOMOUS HELICOPTER PLATFORM filed Oct. 19, 2018, now U.S. Pat. No. 11,443,640, which is incorporated herein by reference for all purposes.

BACKGROUND OF THE INVENTION

Conventional unmanned aerial vehicles (UAVs), or drones, are useful for performing in a number of tasks. Such drones may perform surveillance, delivery of commercial packages or weaponry, mapping of distant or inhospitable regions and/or other missions. Although useful, such drones suffer from a number of drawbacks. For example, drones are typically remotely piloted, may lack reliability, may be slower than desired, may have limited range, and/or may have other issues that adversely affect performance. Consequently, research into drones is ongoing.

BRIEF DESCRIPTION OF THE DRAWINGS

Various embodiments of the invention are disclosed in the following detailed description and the accompanying drawings.

DETAILED DESCRIPTION

Figure 1A:
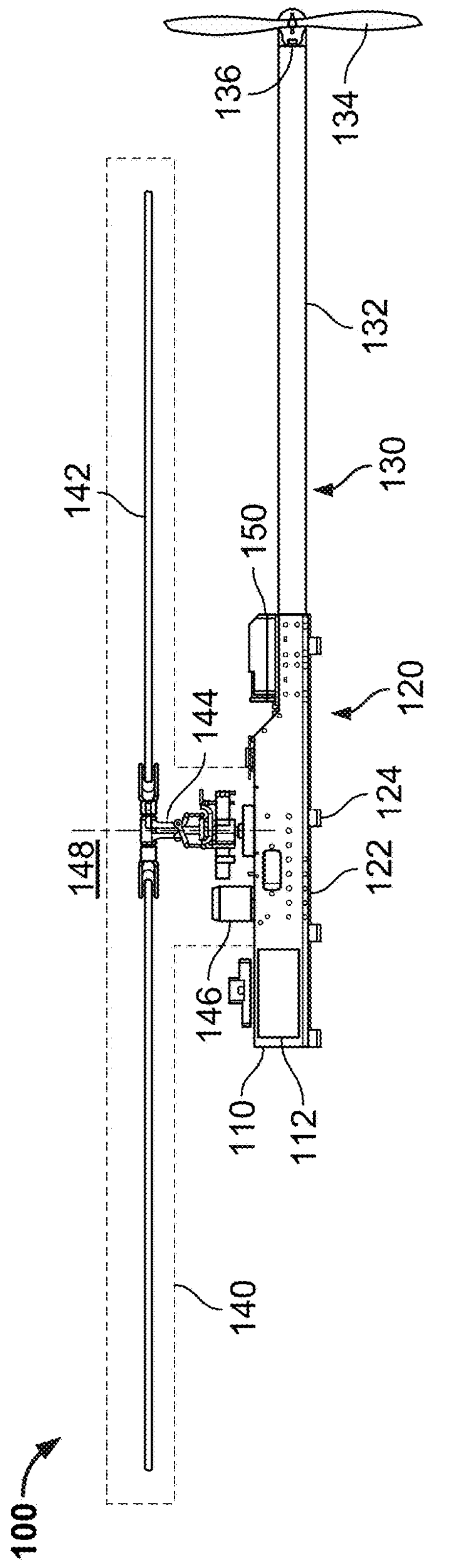
FIGS. 1A-1D depict various views of exemplary embodiments of an unmanned helicopter platform.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention.

Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In one aspect, an unmanned helicopter platform is described. The unmanned helicopter platform includes a fuselage housing flight control electronics, a tail coupled with the fuselage, a main rotor assembly coupled with the fuselage and the flight control electronics and a payload rail coupled with and extending along the fuselage. The tail includes a tail rotor and a tail rotor motor. The main rotor assembly includes a main rotor having an axis of rotation and a main rotor motor. The payload rail allows mechanical connection of a plurality of payloads to the fuselage. The payload rail allows positioning of the plurality of payloads connected to the payload rail such that a center of gravity of the plurality of payloads is able to be aligned with the axis of rotation of the main rotor.

In another aspect, a system for controlling an unmanned helicopter is illustrated. The unmanned helicopter includes a fuselage for retaining flight electronics therein, a tail section coupled with the fuselage, a main rotor assembly coupled with the fuselage, and a payload rail coupled to the fuselage. The system includes a processor and a memory coupled to the processor. The processor is configured to receive a task and dynamically determine a route for the unmanned helicopter for the task. The route is based on the task, geography for the route, and terrain along the route. The processor is also configured to autonomously perform the task including flying along at least a portion of the route. The memory is configured to provide the processor with instructions for determining the route and performing the task.

In another aspect, a method for controlling an unmanned helicopter is described. The unmanned helicopter includes a fuselage for retaining flight electronics therein, a tail section coupled with the fuselage, a main rotor assembly coupled with the fuselage, and a payload rail coupled to the fuselage. The method includes receiving a task and dynamically determining, using a processor, a route for the unmanned helicopter to use in performing the task. The route is based on the task, geography for the route, and terrain along the route. The method also includes autonomously performing the task including flying along at least a portion of the route.

In another aspect, a computer program product for controlling an unmanned helicopter is discussed. The unmanned helicopter includes a fuselage for retaining flight electronics therein, a tail section coupled with the fuselage, a main rotor assembly coupled with the fuselage, and a payload rail coupled to the fuselage. The computer program product may be embodied in a non-transitory computer readable storage medium and includes computer instructions for receiving a task and dynamically determining a route for the unmanned helicopter for the task. The route is based on the task, geography for the route, and terrain along the route. The computer-program product also includes computer instructions for autonomously performing the task including flying along at least a portion of the route.

In another aspect, a method of loading an unmanned helicopter is illustrated. The unmanned helicopter includes a fuselage, a tail, a main rotor assembly and at least one payload rail. The fuselage houses flight control electronics. The tail is coupled with the fuselage and includes a tail rotor and a tail rotor motor. The main rotor assembly is coupled with the fuselage. The main rotor assembly includes a main rotor having an axis of rotation and a main rotor motor. The at least one payload rail is coupled with and extends along the fuselage. The at least one payload rail allows mechanical connection of a plurality of payloads to the fuselage. The method includes suspending the unmanned helicopter from the axis of rotation of the main rotor. The method also positioning the plurality of payloads along the at least one payload rail such that the unmanned helicopter is suspended upright. The plurality of payloads are positioned along the at least one payload rail such that a center of gravity of the plurality of payloads is aligned with the axis of rotation of the main rotor.

Figure 1B:
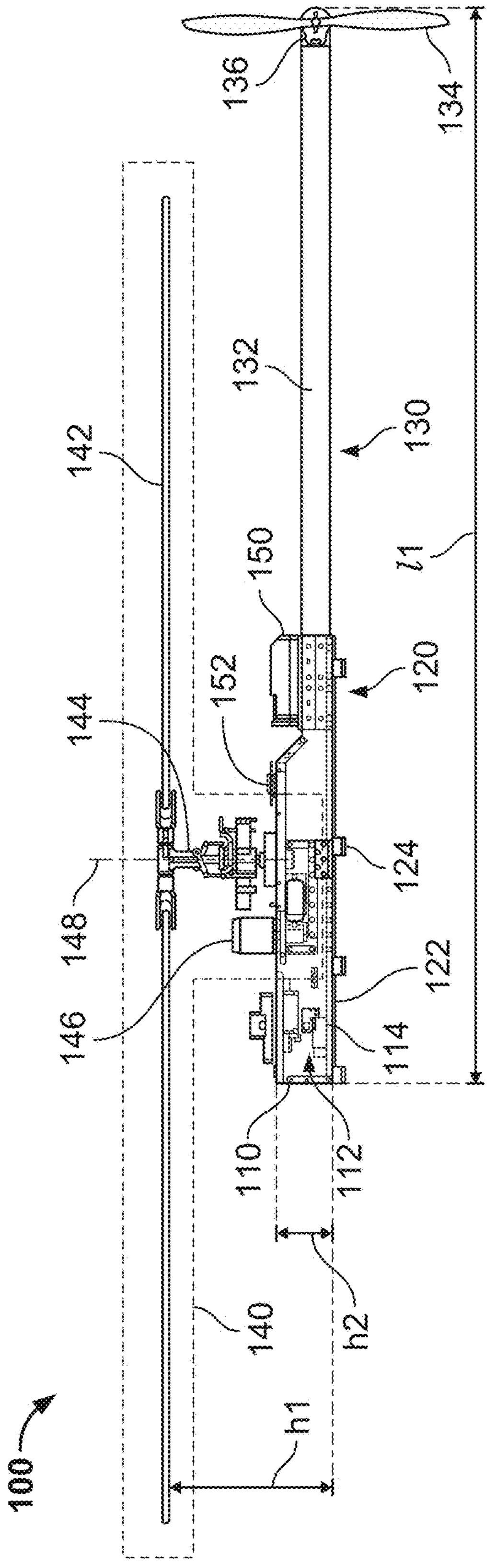
Figure 1C:
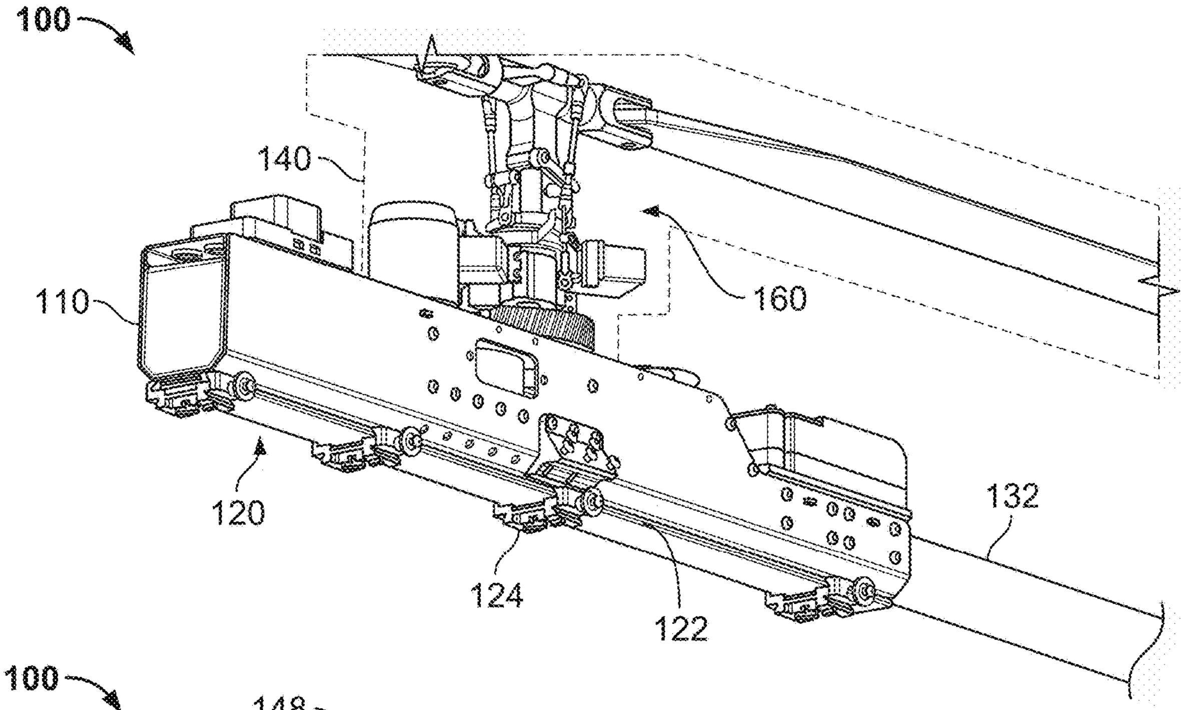
Figure 1D:
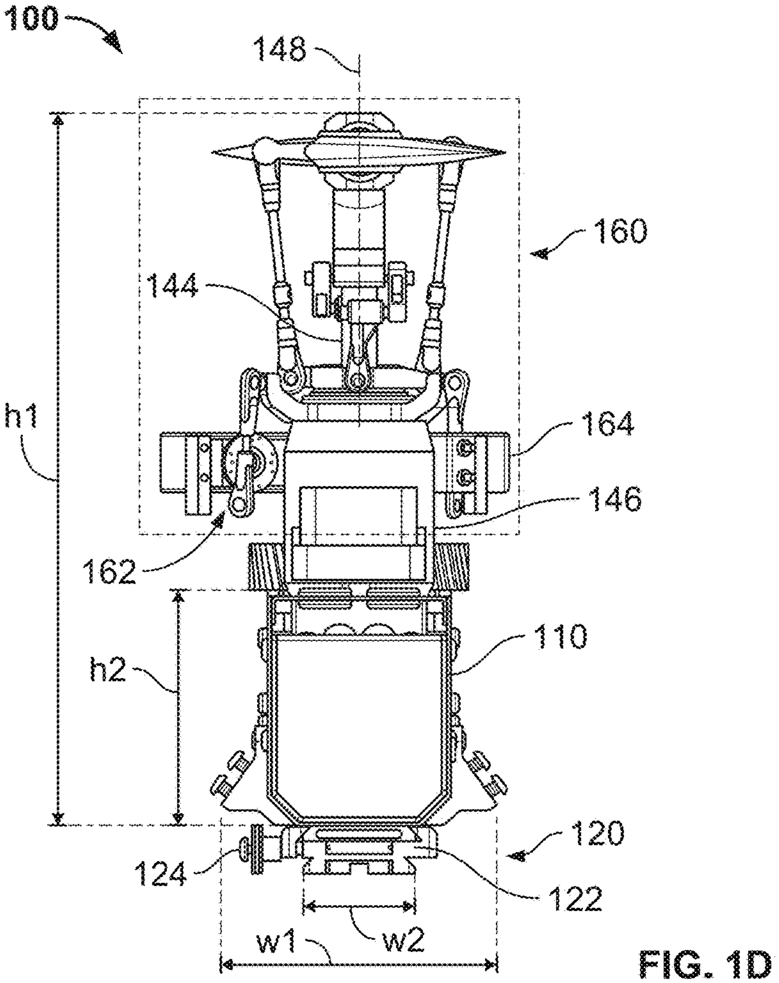

FIGS. 1A-1D depict various views of exemplary embodiments of an unmanned helicopter platform 100. For clarity, FIGS. 1A-1D are not to scale and some components may be omitted and/or not labeled in various views. FIG. 1A is a block diagram of an embodiment of an unmanned helicopter 100. FIGS. 1B-1D depict side, perspective and front views of portions of a particular embodiment of an unmanned helicopter 100.

Unmanned helicopter 100 includes fuselage 110, payload rail 120, tail 130, main rotor assembly 140 and external communications module 150. Fuselage 110 provides structure and stability to unmanned helicopter 100 and houses flight control electronics 112 as well as a portion of the drive train for main rotor assembly 140. Fuselage 110 may thus house some or all of the flight critical components for unmanned helicopter 100. Fuselage is formed of aluminum, for example, bended sheet metal. However, other material(s) and/or methods of forming the fuselage may be used.

Flight control electronics 112 is capable of receiving a task and dynamically determining a route for unmanned helicopter 100 to fly in order to accomplish the task and autonomously flying along at least a portion of the route in order to perform the task. The determination of the route includes not only selecting the route based on the task but also the geography for the route, the terrain along the route, and optionally other factors such as additional tasks, weather conditions, available battery (e.g., where the battery stores local available power for flight and communications), and other internal and/or external considerations. In some embodiments, artificial intelligence core 114 performs these route selection and guidance tasks. Also included in the flight control electronics is a flight controller, a motor controller for rotor motor 146 and power supplies that regulate voltage from the batteries (not shown in FIGS. 1A-1D). Flight control electronics 112 also communicate with other portions of unmanned helicopter 100, such as main rotor assembly 140, tail 130, and external communications module 150.

External communications module 150 receives input from and provides output to systems external to unmanned helicopter 100. For example, external communications module 150 includes a mesh radio. Use of a mesh radio allows for communications with clients such as cellular telephones, laptops, and other computing devices utilizing Internet protocols. Through communications module 150, unmanned helicopter 100A may become part of a network of interconnected mesh devices. The network may include devices such as other drones, sensor stations, the user's computing device or other apparatus used to control unmanned helicopter 100A, unmanned helicopter 100A and any other devices using the mesh network. Thus, unmanned helicopter 100A can exchange information directly with a variety of other devices. Participation in the mesh network may facilitate a variety of autonomous operations performed by unmanned helicopter 100A. In some embodiments, a router or other analogous communication system is incorporated in lieu of or in addition to the mesh radio.

In some embodiments, a global positioning unit 152 is also present. In some embodiments, global positioning unit 152 receives global positioning signals from an external source and thus is considered part of external communications module 150. In the example shown, flight control electronics 112 are at the forward section of fuselage 110, while external communications module 150 is at the aft section of fuselage 110. This allows for physical separation of the electrically noisy components of the drive train from external communications module 150. Thus, performance of external communications module 150 is improved.

Tail 130 is coupled with fuselage 110. Tail 130 includes tail section 132, tail rotor 134 and tail motor 136. Tail section 130 is stiff and may, for example, be formed of a carbon fiber tube. Tail motor 136 drives tail rotor 134. Although not explicitly shown in FIGS. 1A-1D, tail motor 136 is connected to flight electronics 112, which controls tail motor 136. Thus, the drive mechanism for tail 130 is electrical and independent from the rest of the drive train. In some embodiments, tail 130 is modular in nature and may be releasably connected to fuselage 110.

Main rotor assembly 140 is coupled with fuselage 110 and to flight control electronics 112. Main rotor assembly 140 includes main rotor 142, coupled with shaft 144 and rotor motor 146. Main rotor 140 also includes swash plate assembly 160 that includes swash servo links 162 and belt drive 164 that is coupled with motor 146. Main rotor 142 rotates around axis of rotation 148. Axis of rotation 148 is shown by a dashed line extending through shaft 144. Rotor motor 146 is controlled by flight control electronics 112 and drives main rotor 142.

Payload rail 120 is connected with fuselage 110. For example, payload rail 120 is bonded to fuselage 110. In the example shown, payload rail 120 extends substantially along the entire length of fuselage 110. In some embodiments, payload rail 120 extends only partially along fuselage 110. Only one payload rail 120 is shown for unmanned helicopter 100. In some embodiments, multiple payload rails 120 might be used. For example, two or more rails extend in parallel along the bottom of fuselage 110, replacing a single payload rail 120. In some embodiments, a first rail extends only along the forward portion of fuselage 110, in proximity to flight control electronics 112, while another rail extends along the aft portion of fuselage 110. Payload rails are coupled to the sides of fuselage 110 in lieu of or in addition to payload rail 120 coupled to the bottom of fuselage 110. Other configurations are possible. Payload rail(s) 120 is/are, however, configured to allow positioning of multiple payloads connected to payload rail(s) 120 such that a center of gravity of the payloads is able to be aligned with axis of rotation 148 of main rotor 142.

Payload rail 120 includes fixed portion 122 and movable clamps (e.g., movable clamp 124) that slide along fixed portion 122. As can be seen in FIG. 1D, the cross-section of fixed portion 122 has a dovetail design in the embodiment shown. Fixed portion 122 is formed of extruded aluminum and bonded to fuselage 110. However other materials, methods of formation and mechanisms for attachment to fuselage 110 may be used. Payload(s) may be connected to fixed portion 122 via clamps (e.g., movable clamp 124). Although four clamps are shown, only one is labeled for simplicity. The clamps mechanically couple the payload(s) to payload rail 120. Electrical connection is made via connectors (not shown) and/or wiring (not shown) between components on unmanned helicopter 100 and the payload(s). Because the clamps can slide along fixed portion 122, the payloads may be balanced such that their center of gravity is aligned with/substantially directly below axis of rotation 148. In some embodiments, two smaller mass payloads may be coupled via one or more clamps (e.g., clamp 124) in the aft region, while a single larger payload may be clamped attached below the aft region of fuselage 110. The center of gravity of the three payloads (or any other number of payloads) can be adjusted to be below axis of rotation 148 by moving each of the payloads along the rail, and then clamping the payloads in place.

Payload rail 120 allows attachment of most of the non-flight critical systems that unmanned helicopter 100 uses. For example, in some embodiments the energy sources (e.g., batteries, generators, and/or fuel cells) are not present in fuselage 110. Instead, the energy sources are carried as payload(s) mechanically connected via payload rail 120 and electrically connected to components such as flight control electronics 112 and motor 146 and motor 136. Other payloads connected to payload rail 120 may include but are not limited to computer(s), sensors such as a laser altimeter, one or more camera modules, lidar module(s), radar module(s), a megaphone(s), thermal sensor module(s), global positioning module(s) and/or any other payload unmanned helicopter 100A is desired to transport.

Unmanned helicopter 100 has improved performance and reliability. As described below, unmanned helicopter 100 is capable of autonomously performing a variety of tasks, including determination of and guidance along a route. Consequently, a human pilot may be unnecessary for at least part of the operation of the drone. The materials used for the drone allow the drone to be rugged and capable of carrying a large payload. Unmanned helicopter 100 is also modular in nature. Because the batteries are carried as a payload, batteries may be configured to provide the desired energy profile for the selected tasks. For example, batteries may be selected for a higher speed and performance/shorter flight time or lower speed and performance/longer flight time. Thus, performance of unmanned helicopter 100 is tailored to the desired missions. Tail 130 might be disconnected from fuselage 110 in response to there being a failure in the tail drive system. Tail 130 might then be replaced. Similarly, when discharged, the batteries (not shown in FIGS. 1A-1D) carried as payload may be swapped for new batteries. Thus, failure of one or more of the modular components of unmanned helicopter 100 may be replaced. Thus, unmanned helicopter 100 may spend less time being serviced. Unmanned helicopter 100 may also be small in size. In some embodiments, for example, the height of unmanned helicopter 100, h1 in FIGS. 1B and 1D, is two hundred and twenty through two hundred and sixty millimeters; the height of fuselage 110, h2 in FIGS. 1B and 1D, is one hundred through two hundred millimeters; the width of fuselage 110, w1 in FIG. 1D, is fifty through eighty millimeters; and the width of fixed portion 122 of rail 120, w2 in FIG. 1D, is thirty through fifty millimeters. Other dimensions are possible in other embodiments. As can be seen in FIG. 1D, the profile of fuselage 110 and unmanned helicopter 100 is small in some embodiments. As a result, unmanned helicopter 100 may have improved aerodynamics and may be more difficult to visually detect. Thus, the performance, reliability and utility of unmanned helicopter 100 may be improved.

Figure 2A:
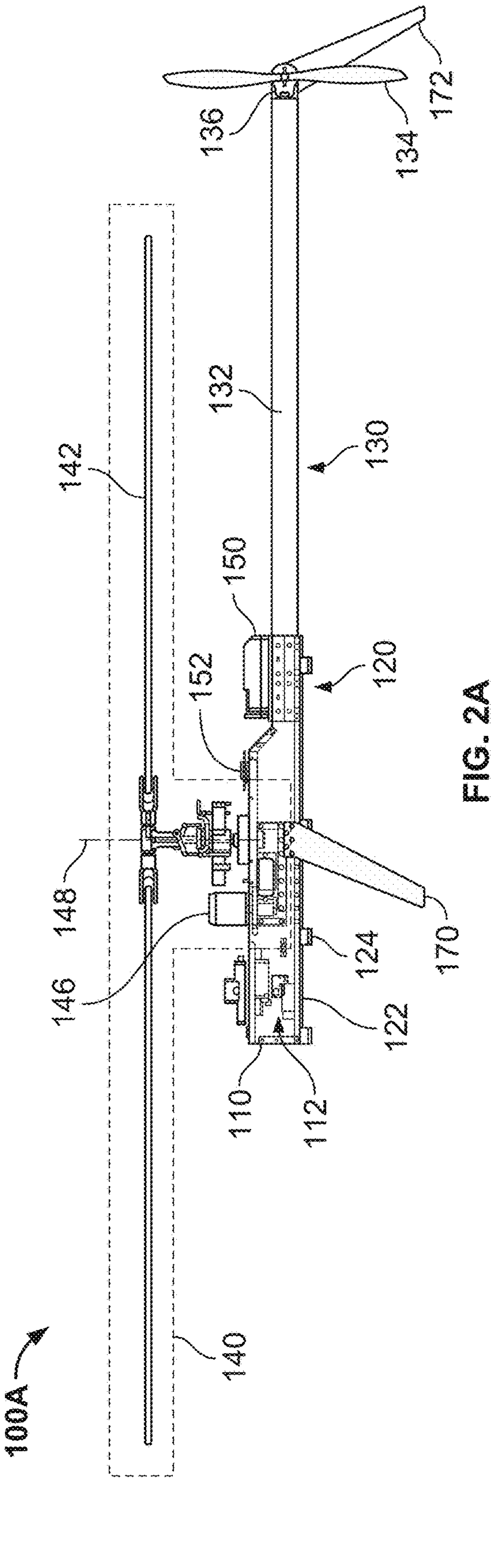
FIGS. 2A-2B depict another exemplary embodiment of an unmanned helicopter platform having landing gear without and with payloads.
Figure 2B:
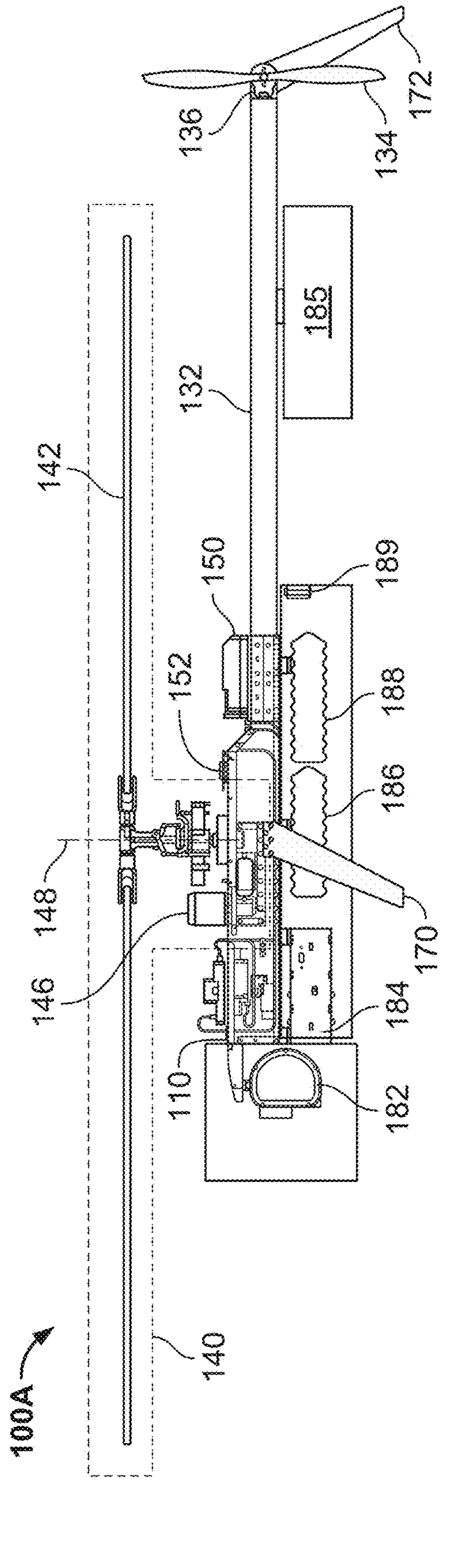

FIGS. 2A-2B depict another exemplary embodiment of unmanned helicopter 100A shown without and with payloads. For clarity, not all components may be depicted or labeled and FIGS. 2A and 2B are not to scale. Unmanned helicopter 100A is analogous to unmanned helicopter 100 depicted in FIGS. 1A-1D. Unmanned helicopter 100A includes fuselage 110 housing flight electronics 112; payload rail 120 including fixed portion 122 and one or more clamps (e.g., clamp 124); tail 130 including tail section 132, tail rotor 134 and tail motor 136; main rotor assembly 140 including main rotor 142, rotor shaft 144, main motor 146 with its axis of rotation 148; external communications module 150 and global positioning unit 152 that are analogous to those for unmanned helicopter 100. Unmanned helicopter 100A also includes landing gear 170 and landing gear 172. Landing gear 170 is coupled to fuselage 110. Although only one landing gear 170 is shown in the side view, typically landing gear 170 reside on both sides of the fuselage. Landing gear 172 is coupled with tail 130.

Also shown in FIG. 2B are payload 182, payload 184, payload 185, payload 186, payload 188 and payload 189. In some embodiments, payload 185 is an antennae connected to tail 130. In some embodiments, payload 185 is affixed to tail section 132, while in others payload 185 is releasably mounted to tail section 132. In some embodiments, an antennae mounted in payload 185 is used by external communications module 150. For example, the antennae comprises a mesh radio antennae and/or any other appropriate antennae.

Payload 182, payload 184, payload 185, payload 186, payload 188 and payload 189 are releasably mounted to fuselage 110. In some embodiments, payload 182, payload 184, payload 185, payload 186, payload 188 and payload 189 are coupled to payload rail 120. In some embodiments, unmanned helicopter 100A includes a front mount for payload 182. In the example shown, payload 182 includes one or more cameras. Payload 184 is a compute payload including at least one processor and memory. In some embodiments, the compute payload is coupled to one or more cameras via wiring passing through fuselage 110. In some embodiments, image processing, image recognition and other tasks related to data captured by the one or more cameras performed by the compute payload. Data from the one or more cameras is used in autonomously guiding unmanned helicopter 100A.

In some embodiments, payload 186 and payload 188 are batteries that provide energy to unmanned helicopter 100A. The power provided by the batteries to motor 146 and motor 136 and other components is controlled by flight electronics 112. The energy profile of the batteries can be selected such that the desired performance of unmanned helicopter 100A is achieved. In the example shown, power is only provided via the batteries carried as payload. In some embodiments, a battery carried in the fuselage provides some power for unmanned helicopter 100A—for example, such a battery carries emergency power sufficient for communications. In addition, one or both of the electrical batteries may be replaced by another power source, such as a gas powered energy source. Such a power source may provide a different energy profile to unmanned helicopter 100A. Also shown is payload 189 that may include one or more sensors. For example, payload 189 may be a laser altimeter. Signals from the laser altimeter may be provided to flight electronics 112 via wiring (not shown) or in another manner.

Because at least some of payload 182, payload 184, payload 185, payload 186, payload 188 and payload 189 are coupled via payload rail 120, payload 182, payload 184, payload 185, payload 186, payload 188 and payload 189 are positioned such that their center of gravity is substantially aligned with axis of rotation 148. As used herein, "aligned" with axis of rotation 148 may include not only intersecting axis associated with axis of rotation 148, but also in a small region surrounding axis of rotation 148. Note that even though payload 182 is not connected to fuselage 110 via payload rail 120, the remaining payloads (e.g., payload 184, payload 186, payload 188, and payload 189) are movable along rail 120 and may be positioned such that the center of gravity of all payloads (e.g., payload 182, payload 184, payload 186, payload 188, and payload 189) is aligned with axis of rotation 148. Although specific payloads (e.g., payload 182, payload 184, payload 186, payload 188, and payload 189) having a particular configuration are shown in FIG. 2B, other and/or additional payloads having a different configuration may be present. However, use of payload rail 120 may still allow the center of gravity of the payloads to be aligned with the axis of rotation 148.

Unmanned helicopter 100A has improved performance, flexibility and reliability. Unmanned helicopter 100A utilizes additional tools provided via the payload 182, payload 184, payload 186, payload 188, and payload 189 mounted on payload rail 120 to autonomously perform tasks. The types and numbers of missions performed by unmanned helicopter 100A may be extended by changing the payload 182, payload 184, payload 186, payload 188, and/or payload 189. Configuration of battery payloads also allows tailoring of the performance of unmanned helicopter 100A to a desired mission. For example, speed may be increased at the expense of flight time or vice versa. The modular nature of the payload 182, payload 184, payload 186, payload 188, and payload 189 of unmanned helicopter 100A generally may improve the reliability of unmanned helicopter 100A because faulty components may be more readily replaced. As indicated above, unmanned helicopter 100A also has a small profile improving aerodynamics and reducing visibility. Thus, the performance, reliability, and utility of unmanned helicopter 100A are improved.

Figure 3A:
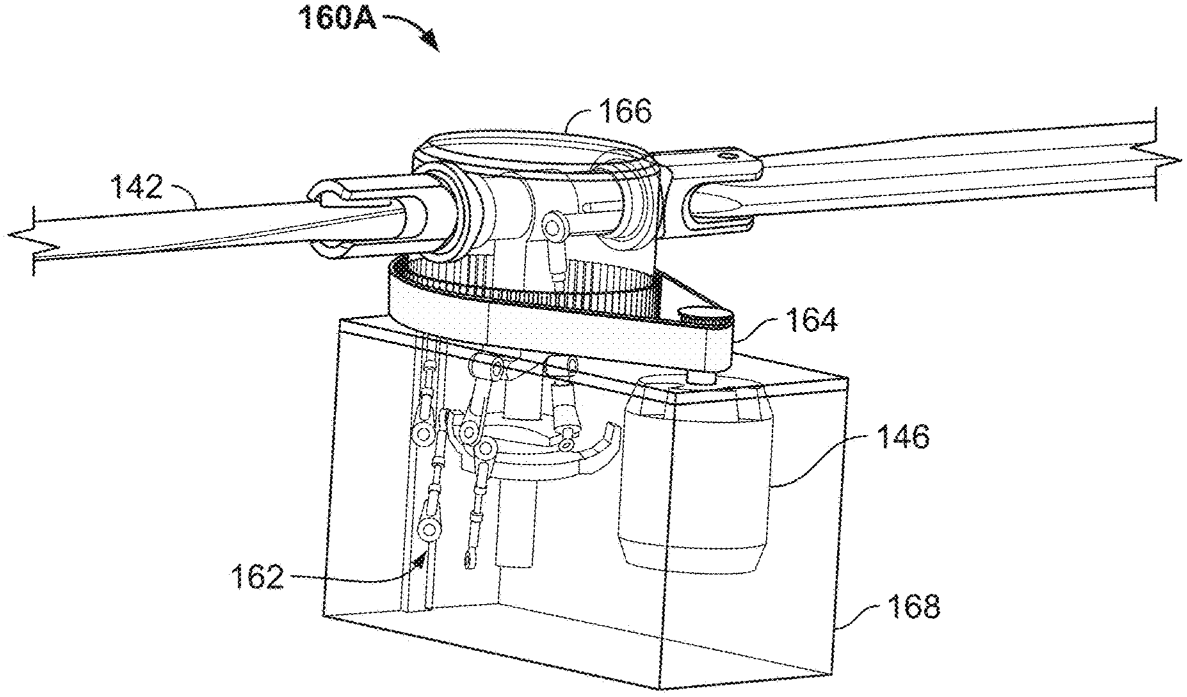
FIGS. 3A-3B are diagrams depicting various perspective and side views of an exemplary embodiment of a swash plate assembly usable in an unmanned helicopter platform.
Figure 3B:
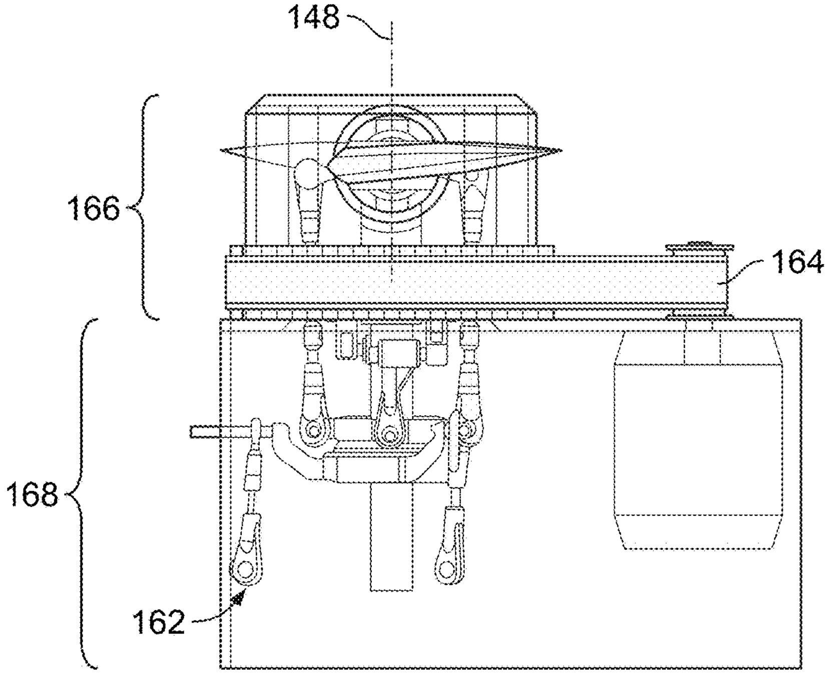

FIGS. 3A-3B are diagrams depicting various perspective and side views of an exemplary embodiment of an enclosed swash assembly 160A usable in an unmanned helicopter such as unmanned helicopter 100 and/or unmanned helicopter 100A. For clarity, not all components may be depicted or labeled and FIGS. 3A and 3B are not to scale. Also shown in FIGS. 3A-3B are rotor motor 146 and a portion of rotor 142. Enclosed swash assembly 160A includes, among other components, swash servo links 162 and belt drive 164 (sometimes knows as belt drive assembly). In the example shown, swash assembly 160A also includes rotating enclosure 166 and fixed enclosure 168. As its name implies, rotating enclosure 166 encloses portions of enclosed swash assembly 160A and spins around axis of rotation 148. Stated differently, rotating enclosure rotates with respect to fuselage 110. Fixed enclosure 168 remains in an unchanging position with respect to the fuselage 110 (not shown in FIGS. 3A-3B).

Enclosed swash assembly 160A improves reliability and use of unmanned helicopter 100A. In general, the components of enclosed swash assembly 160A are complex and tend to attract debris. Particularly in harsh environments, components of a helicopter swash assembly are more likely to fail and/or require servicing. Enclosures (e.g., rotating enclosure 166 and fixed enclosure 168) protect the components of enclosed swash assembly 160A from contaminants. Stated differently, enclosed swash assembly 160A protects against ingress of water, dust, or other foreign objects that could damage the mechanisms of the swashplate. Thus, the complicated mechanical components in unmanned helicopter are less exposed to the environment, less likely to fail and/or require less maintenance. Thus, performance of the unmanned helicopter employing enclosed swash assembly 160A is improved.

Figure 4A:
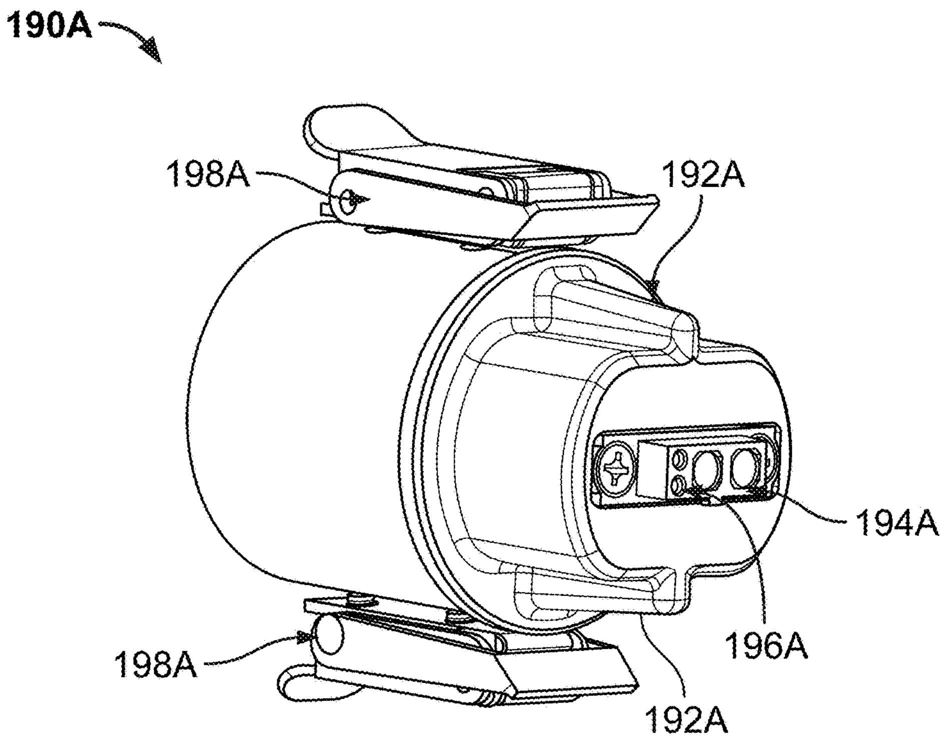
FIGS. 4A-4D are diagrams depicting exemplary embodiments of a modular tail coupling for an unmanned helicopter platform.
Figure 4B:
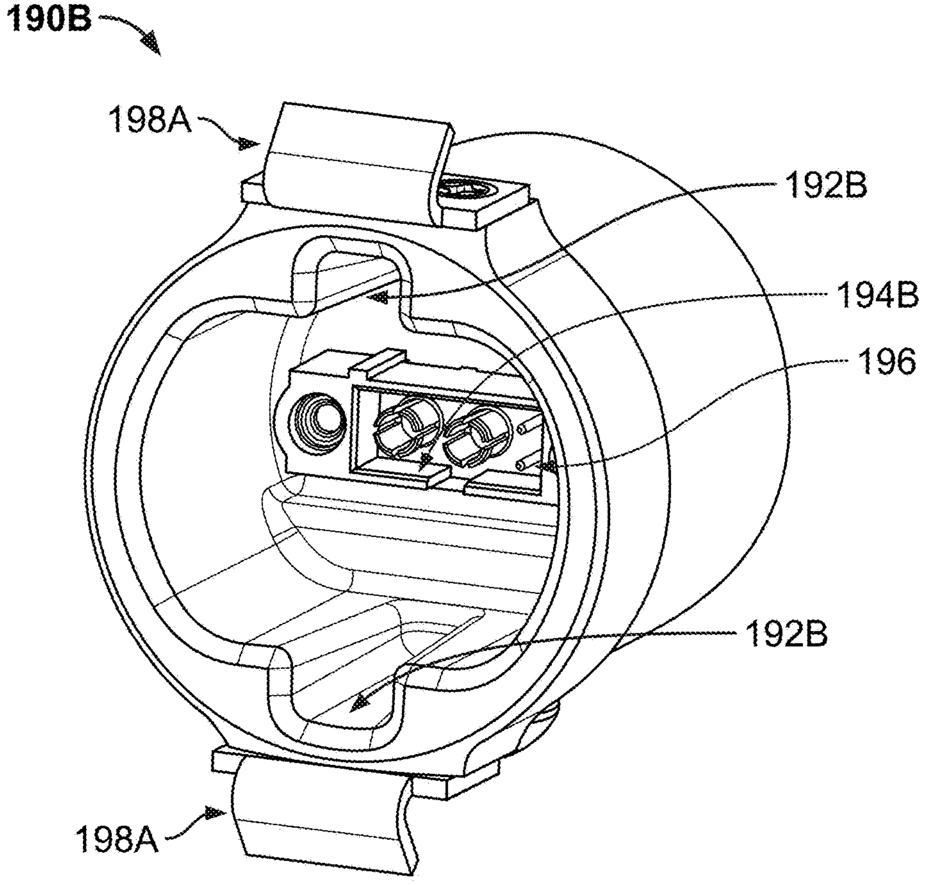
Figure 4C:
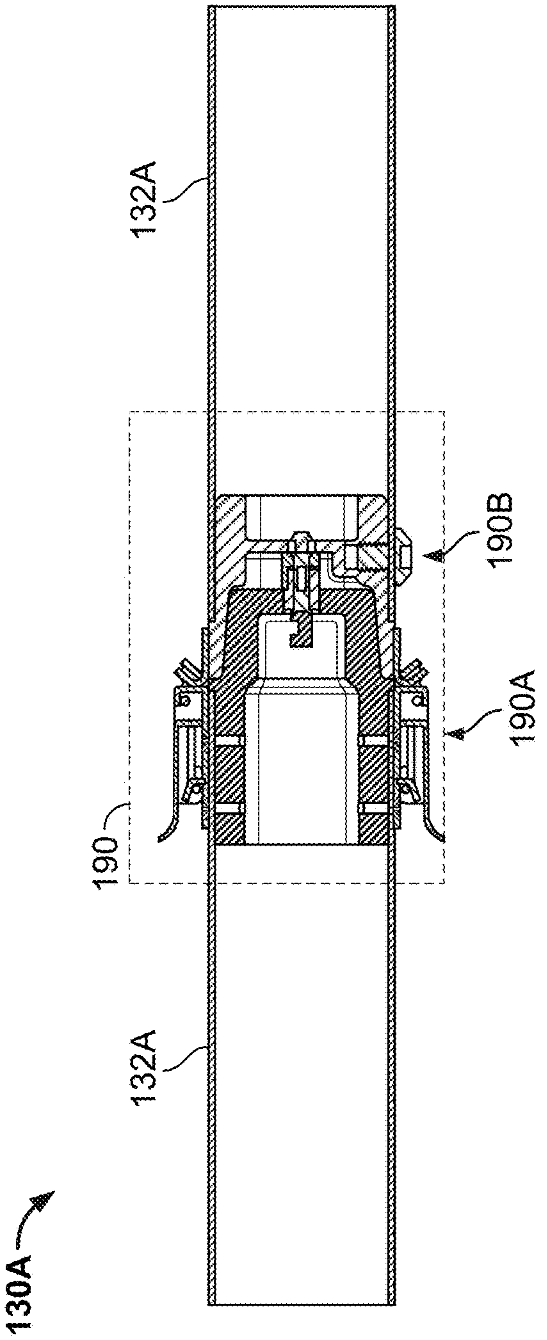
Figure 4D:
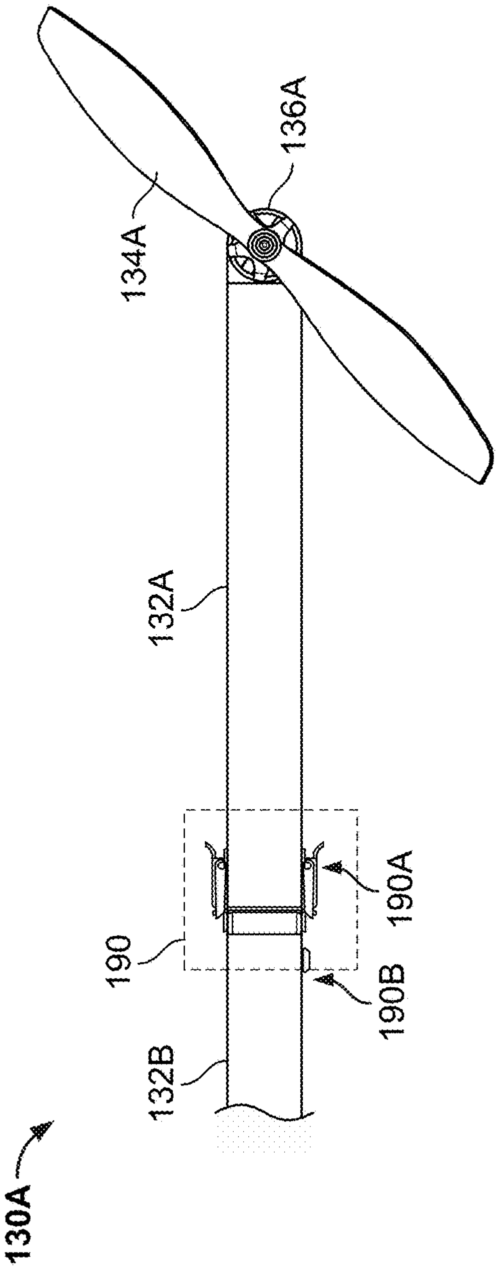

FIGS. 4A-4D are diagrams depicting exemplary embodiments of a modular tail coupling for an unmanned helicopter. In some embodiments, a modular tail coupling is used to implement a modular tail coupling for unmanned helicopter 100 and/or 100A. For clarity, not all components may be depicted or labeled and FIGS. 4A-4D are not to scale. In the example shown in FIGS. 4A and 4B, male coupling 190A and female coupling 190B fit together to form modular coupling (e.g., modular coupling 190 of FIGS. 4C and 4D). FIGS. 4C and 4D depict modular coupling 190 in use tail 130A. Tail 130A is used in lieu of tail 130 in unmanned helicopter 100 and/or unmanned helicopter 100A. Male coupling 190A includes alignment features 192A, power connection 194A, data connection 196A, and latches 198A. Female coupling 190B includes alignment features 192B, power connection 194B, data connection 196B, and latches 198B. Alignment features 192A are configured to align and mate with alignment features 192B. Similarly, power connection 194A and power connection 194B as well as data connection 196A and data connection 196B mate to provide data and power to tail 130. Thus, tail motor 136A and tail rotor 134A may be controlled. Latches 198A and latches 198B cooperate to hold tail section 132A and tail section 132B together. Although modular tail coupling 190 is shown near the middle of tail 130A, in some embodiments, modular tail coupling 190 may be located closer to or at the fuselage (not shown in FIGS. 4A-4D) or closer to tail rotor 134A. Thus, using modular tail coupling 190, some or all of tail 130A may be removably coupled to fuselage 110.

Figure 5:
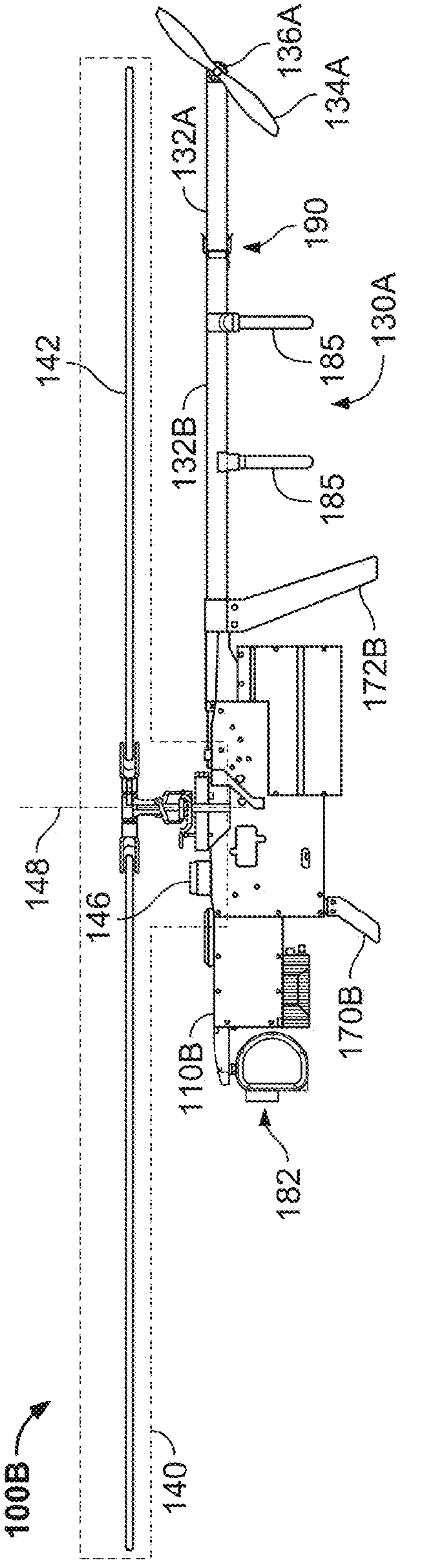
FIG. 5 depicts another exemplary embodiment of an unmanned helicopter platform having a modular tail coupling.

FIG. 5 depicts an exemplary embodiment of unmanned helicopter 100B employing an embodiment of modular tail coupling 190. For clarity, not all components may be depicted or labeled and FIG. 5 is not to scale. Unmanned helicopter 100B is analogous to unmanned helicopter 100 and unmanned helicopter 100A depicted in FIGS. 1A-1D and 2A-2B. Unmanned helicopter 100B includes fuselage 110B housing flight electronics; a payload rail (not explicitly shown); tail 130A; main rotor assembly 140 including main rotor 142 having axis of rotation 48, main motor 146 and an external communications module that are analogous to those for unmanned helicopter 100 and unmanned helicopter 100A. Unmanned helicopter 100B also includes landing gear 170B and landing gear 172B, which are configured differently than landing gear 170 and landing gear 172, respectively. Landing gear 170B is still coupled to fuselage 110. Although only one landing gear 170B is shown in the side view, typically landing gear 170B resides on both sides of the fuselage. Landing gear 172B is coupled with tail 130A. Also connected to tail 130A are antennae 985 and antennae 986, which may be mesh radio antennae. As can be seen in FIG. 5, modular coupling 190 allows for tail section 132A to be decoupled from tail section 132B and replaced. In addition to or in lieu of modular coupling 190, tail 130A might include a lockable hinge. Such a hinge would allow tail 130A to be folded in—for example during shipping. In some embodiments, the hinge includes a mechanism for controlling the motion of electrical wires passing through tail 130A as the hinge actuates. Such a mechanism may remove the requirement for an interconnect at the hinge and prevent damage to electrical wires during actuation of the hinge. When unmanned helicopter 100B is deployed, tail 130A may be extended and the hinge locked in place.

Coupling 190 and removable tail 130A may improve performance and reliability of an unmanned helicopter. Tail 130A is modular in nature. Thus, in response to faults being detected in section 132A of tail 130A, this portion may be removed from the unmanned helicopter. For example, in response to motor 136A or tail rotor 134A being damaged, they may be easily removed from the unmanned helicopter and replaced with a new section. Similarly, in response to performance of tail rotor 134A being desired to be upgraded or changed, coupling 190 allows replacement of this portion of tail 130A. Consequently, the components of tail 130A may be tailored to the mission. In addition, tail section 132A may be removed for more compact shipping. Thus, performance of the unmanned helicopter employing removable tail 130A is improved.

Figure 6B:
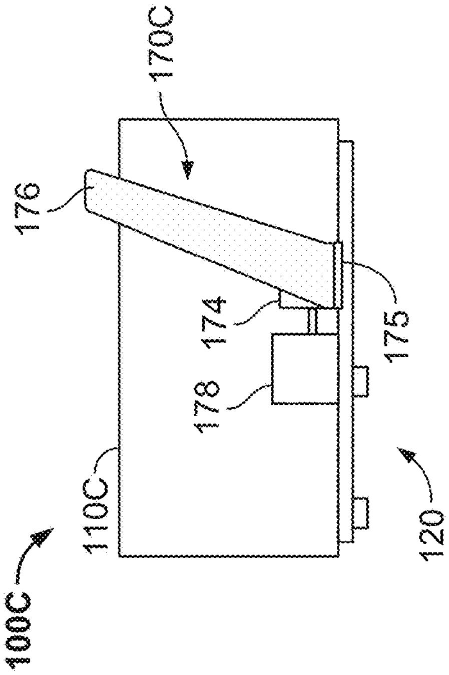
FIGS. 6A-6B depict an exemplary embodiment of an unmanned helicopter platform having retractable landing gear.
Figure 6A:
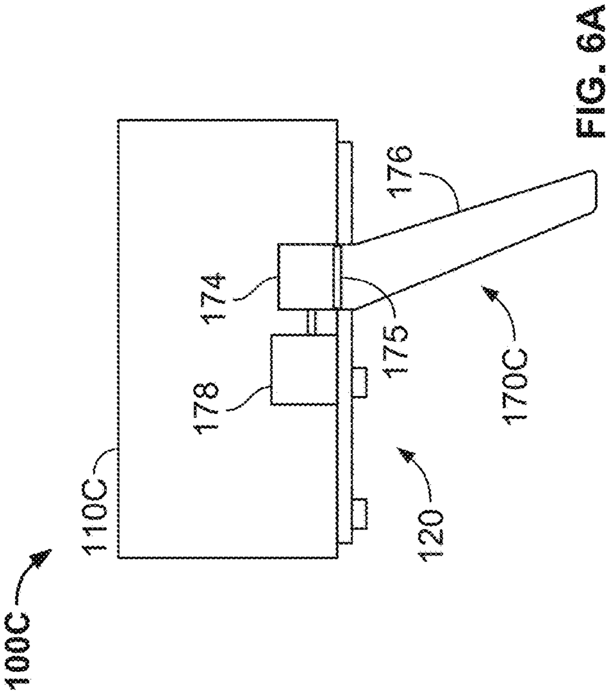

FIGS. 6A-6B depict an exemplary embodiment of a portion of an unmanned helicopter 100C having retractable landing gear 170C. For clarity, not all components may be depicted or labeled and FIGS. 6A-6B are not to scale. FIG. 6A depicts a portion of unmanned helicopter 100C showing landing gear 170C deployed, while FIG. 6B depicts unmanned helicopter 100C with landing gear 170C retracted. Unmanned helicopter 100C is analogous to unmanned helicopter 100, unmanned helicopter 100A, and unmanned helicopter 100B depicted in FIGS. 1A-1D, 2A-2B and 5. Unmanned helicopter 100C includes fuselage 110C housing flight electronics; payload rail 120; a tail (not explicitly shown); a main rotor assembly (not shown) that are analogous to those for unmanned helicopter 100, unmanned helicopter 100A, and/or unmanned helicopter 100B. Other components may be included in unmanned helicopter 100C but are not shown for clarity. Unmanned helicopter 100C also includes landing gear 170C. Landing gear 170C is still coupled to fuselage 110C. However, in another embodiment, landing gear 170C might be coupled to the tail (not shown) or another portion of unmanned helicopter 100C.

Landing gear 170C includes first section 174 and second section 176 connected via hinge 178. Also shown are landing gear motor 178 that is electrically connected to section 176. First section 174 is fixed. In some embodiments, first section 174 is bolted to fuselage 110C or other component. Second component 176 may be deployed to contact the ground or other external surface when unmanned helicopter 100C lands. In operation, motor 178 deploys and retracts second component 176. Thus, motor 178 and associated mechanical components (not shown), rotate second component 176 around hinge 175 to extend component 176 away from fuselage 110C when unmanned helicopter 100C is to land. This situation is shown in FIG. 6A. When unmanned helicopter 100C is flying, motor 178 may rotate section 176 around hinge 175 to retract. In some embodiments, section 176 is substantially flush against fuselage

1110A when landing gear 170C is not deployed. Motor 178 may be controlled by flight control electronics (not shown in FIGS. 6A-6B), a compute payload and/or other control mechanism. Thus, landing gear 170C may be automatically deployed or retracted depending upon the current task(s) being executed.

Use of retractable landing gear 170C may improve performance of unmanned helicopter 100C. Because landing gear 170C may be deployed, unmanned helicopter 100C may be better able to land without damage. Because landing gear 170C is retractable, landing gear 170C may not obscure a payload coupled to payload rail 120. For example, a very large camera may be desired to be connected to the middle of payload rail 120, at or near axis of rotation. When deployed, landing gear 170C may obscure a portion of the field of view of the camera. Consequently, retracting landing gear 170C allows the camera to have a larger field of view and better perform the desired functions. In addition, retracting landing gear 170C may improve the aerodynamics of the abandoned helicopter. Thus, operation and reliability of unmanned helicopter 100C employing retractable landing gear 170C is improved.

Figure 7:
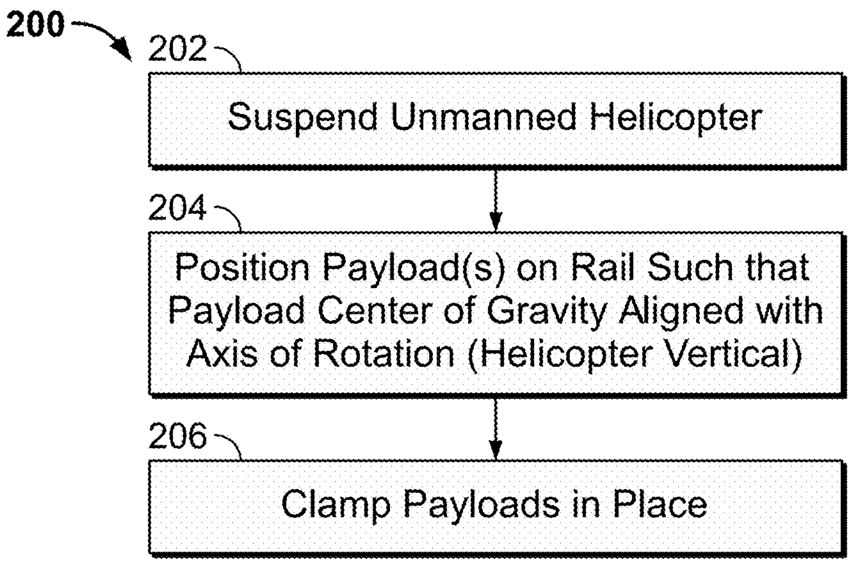
FIG. 7 depicts an exemplary embodiment of a method for loading an unmanned helicopter.

FIG. 7 depicts an exemplary embodiment of method 200 for loading an unmanned helicopter. In various embodiments, method 200 is used for loading unmanned helicopter 100, unmanned helicopter 100A, unmanned helicopter 100B, and/or unmanned helicopter 100C. For simplicity, method 200 is described in the context of unmanned helicopter 100A depicted in FIGS. 2A-2B.

Unmanned helicopter 100A is suspended, in 202. The suspension point is desired to be along the axis of rotation 148. For example, unmanned helicopter 100A might be suspended from the center of the rotor 142.

The payload 182, payload 184, payload 186, and payload 188 desired to be carried are coupled to payload rail 120, via 204. 204 may include attaching clamps (e.g., clamp 124) to the payload 182, payload 184, payload 186, and/or payload 188. The clamps are also coupled with fixed rail 122 but are free to slide along fixed rail 122. Also in 204, the payloads are positioned along payload rail 120 such that the center of gravity of the plurality of payloads (e.g., payload 182, payload 184, payload 186, and payload 188) is aligned with axis of rotation 148 of main rotor 142. Because unmanned helicopter 100A is suspended in 202, this corresponds to unmanned helicopter 100A being substantially upright (axis of rotation 148 being substantially vertical). Thus, unmanned helicopter 100A is not significantly tilted forward, backward or to either side.

The payloads (e.g., payload 182, payload 184, payload 186, and payload 188) are clamped into place at 206. Thus, the positions of the payloads (e.g., payload 182, payload 184, payload 186, and payload 188) are fixed.

Using method 200, multiple payloads may be attached to the unmanned helicopter and balanced simply and easily. As a result, unmanned helicopter 100A is capable of carrying multiple payloads having different weights.

Figure 8:
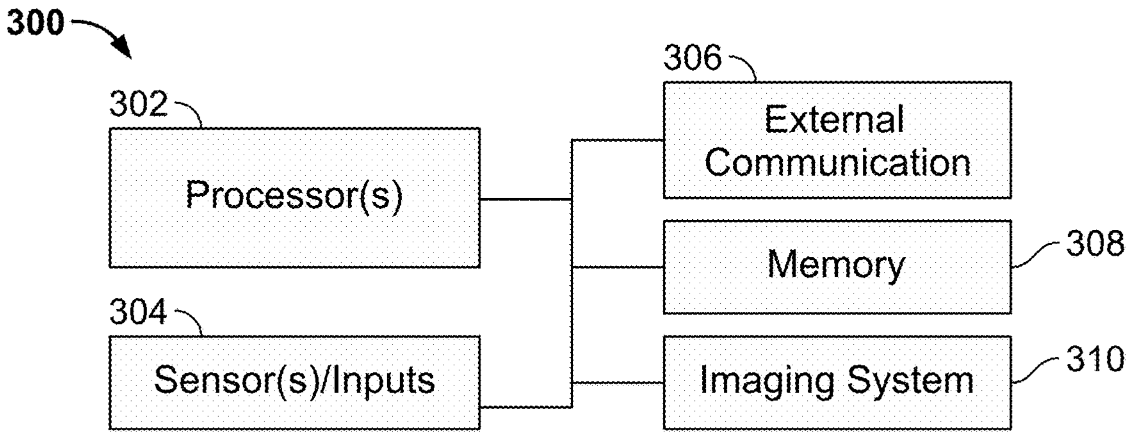
FIG. 8 is a block diagram depicting an exemplary embodiment of a control system for an unmanned helicopter.

As mentioned above, unmanned helicopter 100, unmanned helicopter 100A, unmanned helicopter 100B, and unmanned helicopter 100C are also autonomous. FIG. 8 is a block diagram depicting an exemplary embodiment of control system 300 for an unmanned helicopter such as unmanned helicopter 100, unmanned helicopter 100A, unmanned helicopter 100B, and/or unmanned helicopter 100C that facilitates autonomous functions. For simplicity, control system 300 is also described in the context of unmanned helicopter 100A. Control system 300 includes processor(s) 302, memory 308 and may include sensors/inputs 304, external communication module 306, and imaging system 310. Some of the components of control system 300 reside in a fuselage. Other components may be carried as payloads or otherwise connected to the fuselage. For example, some or all of processor(s) 302 and memory 308 may reside in an artificial intelligence core. Alternatively, some or all of processor(s) 302 and memory 308 may be in the computer payload. External communication 306 may include the mesh radio in an external communications module, a global positioning unit, and/or other mechanism for sending or receiving data and commands. Sensors/Inputs 304 may be affixed to a fuselage or carried as payload. For example, a laser altimeter may be a payload as shown in unmanned helicopter 100A or may be directly connected to the fuselage. Other types of inputs such as for audio data, other visual data, wind data, other weather data, radar data and/or thermal/temperature data may come from sensors/inputs 304, other payloads and/or from other sensor stations not attached to unmanned helicopter 100A. Imaging system 310 may include the cameras mounted as a payload and/or other visual sensor(s).

Using system 300, an unmanned helicopter may autonomously perform a variety of tasks, obviating the need for a pilot or fine control over operation of the unmanned helicopter. In some embodiments, the unmanned helicopter may not include any mechanism for remote piloting. Instead, the unmanned helicopter is controlled on a task basis.

Figure 9:
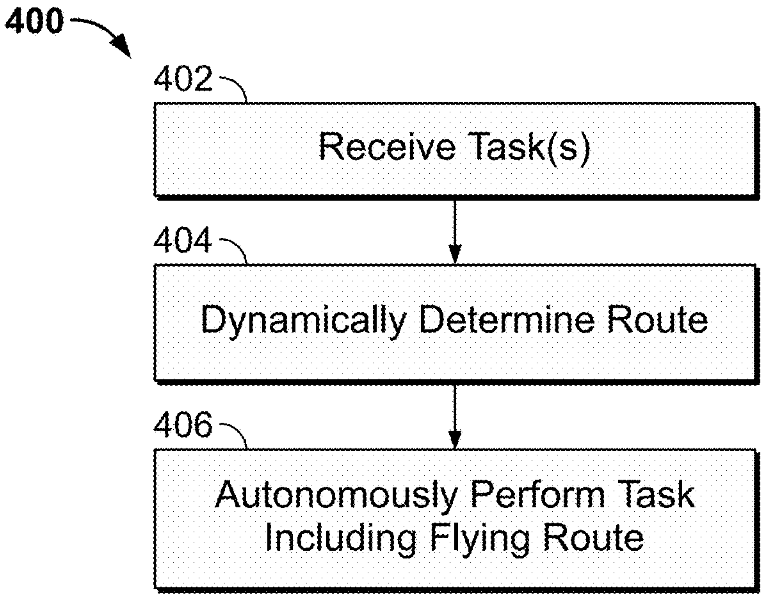
FIG. 9 is a flow chart depicting an exemplary embodiment of a method for autonomously performing tasks using an exemplary embodiment of an unmanned helicopter.

For example, FIG. 9 is a flow chart depicting an exemplary embodiment of method 400 for autonomously performing tasks using an exemplary embodiment of an unmanned helicopter. Method 400 is described in the context of system 300 and unmanned helicopter 100A. However, in another embodiment, other control systems and unmanned helicopters might be used.

Processor(s) 302 for unmanned helicopter 100A receive a task, via 402. The task may be received prior to unmanned helicopter 100A being deployed (e.g. when unmanned helicopter 100A is still at its start location). The task may also be received while unmanned helicopter 100A is in flight on a mission. Further, multiple tasks may be received and executed by processor(s) 302 and unmanned helicopter 100A. Examples of tasks that may be received include but are not limited to searching a region for an object, following an object, avoiding an area, flying to a particular location, flying home, landing in a safe area, capturing image(s) of a particular location, detecting and accounting for faults, remaining acoustically undetectable (e.g., flying at a distance far enough away from a specified location so that the unmanned helicopter is not audibly detectable from a person/animal located at the specified location), patrolling an area, automatically handing off to another drone, remaining visually undetectable based on the position of the sun (e.g., flying such that the unmanned helicopter is not visibly detectable from a person/animal located at a specified location by positioning itself between the specified location and the position of the sun in the sky to the person/animal located at the specified location), mapping the terrain over a region, finding a location at which the unmanned helicopter can land to continue surveillance from a standstill, aiming a camera for landing, re-centering images on a user-selected region, employing optical camouflage, or some other appropriate combination of one or more of the above tasks and/or other missions. As indicated by the items in the nonexhaustive list above. Some of the tasks are naturally combined, such as following an object while remaining acoustically and visually undetectable. However, nothing prevents other combinations. In response to tasks that are mutually exclusive being received, an error message may be provided and a user prompted to select/remove one or more of the tasks. The tasks received in 402 may be provided by a user, for example by selecting task(s) from a menu, defining region(s) to search or avoid, or otherwise communicating with the control system in a task-based fashion. Stated differently, the tasks received in 402 are not provided by a user remote-piloting unmanned helicopter 100A. In addition, the command(s) received in 404 may simply be provided using a smart phone, portable computer or other IP-enabled device.

A route for unmanned helicopter 100A to traverse for the task is determined at 404. The determination of the route in step 404 takes into account the task(s) received in 402, geography for the possible routes, and terrain along the possible route. For example, in response to the task received in 402 being to search for an object that can move, such as a person or vehicle, the route determined in 404 may be different than a search for a static object or a task to map the terrain over a region. The routes selected may also avoid obstacles, such as tall building. Other factors may also be taken into account in determining the route. For example, weather conditions such as the wind speed and direction may also be incorporated in selecting the route. In such a case, the route selected may be such that the expected headwinds are minimized and the expected tail winds maximized. The amount of battery power available, time taken to complete the task or other factors may also be accounted for. These conditions may be obtained from sensors 304 on unmanned helicopter 100A, such as wind or other sensors, additional assets having sensors in the region, global positioning data and/or other data from internal or external sources. These and other data may be received from other assets in the mesh network to which unmanned helicopter 100A is connected via external communications module/mesh radio 150.

A number of possible routes may be determined at 404 based on the factors above. Each of the factors may be accorded a weight based on predetermined goals. A cost function and a target goal may be provided. The expected cost of each route may be determined and the minimum cost route may be selected as the optimal route. In other embodiments, other mechanisms may be used to select the route.

The task is then autonomously performed by unmanned helicopter 100A, including flying along at least a portion of the route, via 406. Using sensors/inputs 304, processor(s) 302, and imaging system 310 as needed, the flight control electronics autonomously traverse the route and perform the task desired.

Using method 400 and control system 300, unmanned helicopter 100A can autonomously perform various tasks including route selection and flight along the route. Consequently, method 400 may obviate the need for a pilot for at least some portion of the missions flown by an unmanned helicopter. Thus, the skill required to pilot the unmanned helicopter and substantially constant communication between the pilot and the unmanned helicopter may be unnecessary. Further, a single user may be able to monitor and control multiple unmanned helicopters. Consequently, flexibility and ease of use of the unmanned helicopter implementing method 400 is improved.

Figure 10A:
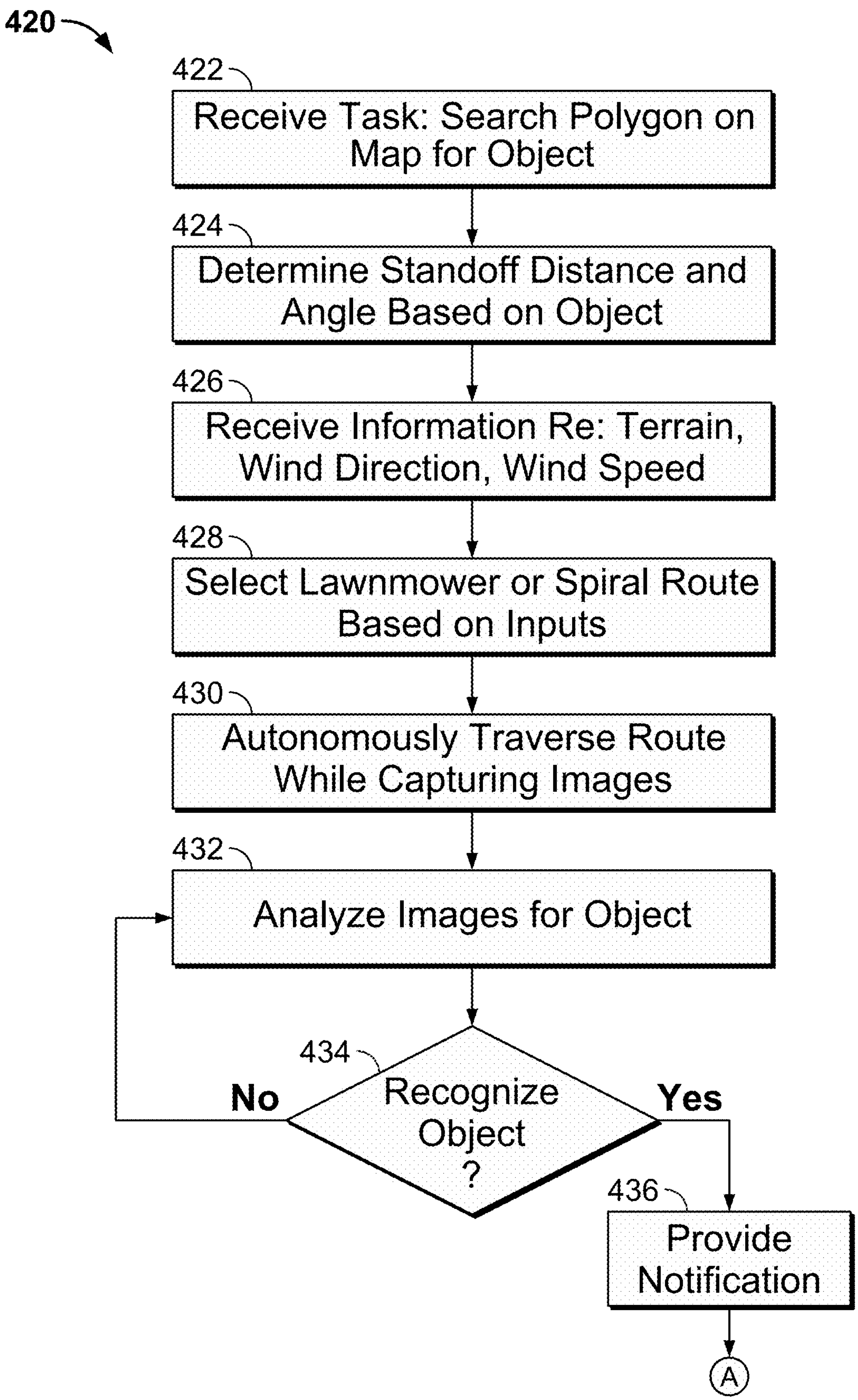
FIGS. 10A-10B depict a flow chart of an exemplary embodiment of a method for autonomously searching an area using an exemplary embodiment of an unmanned helicopter.
Figure 10B:
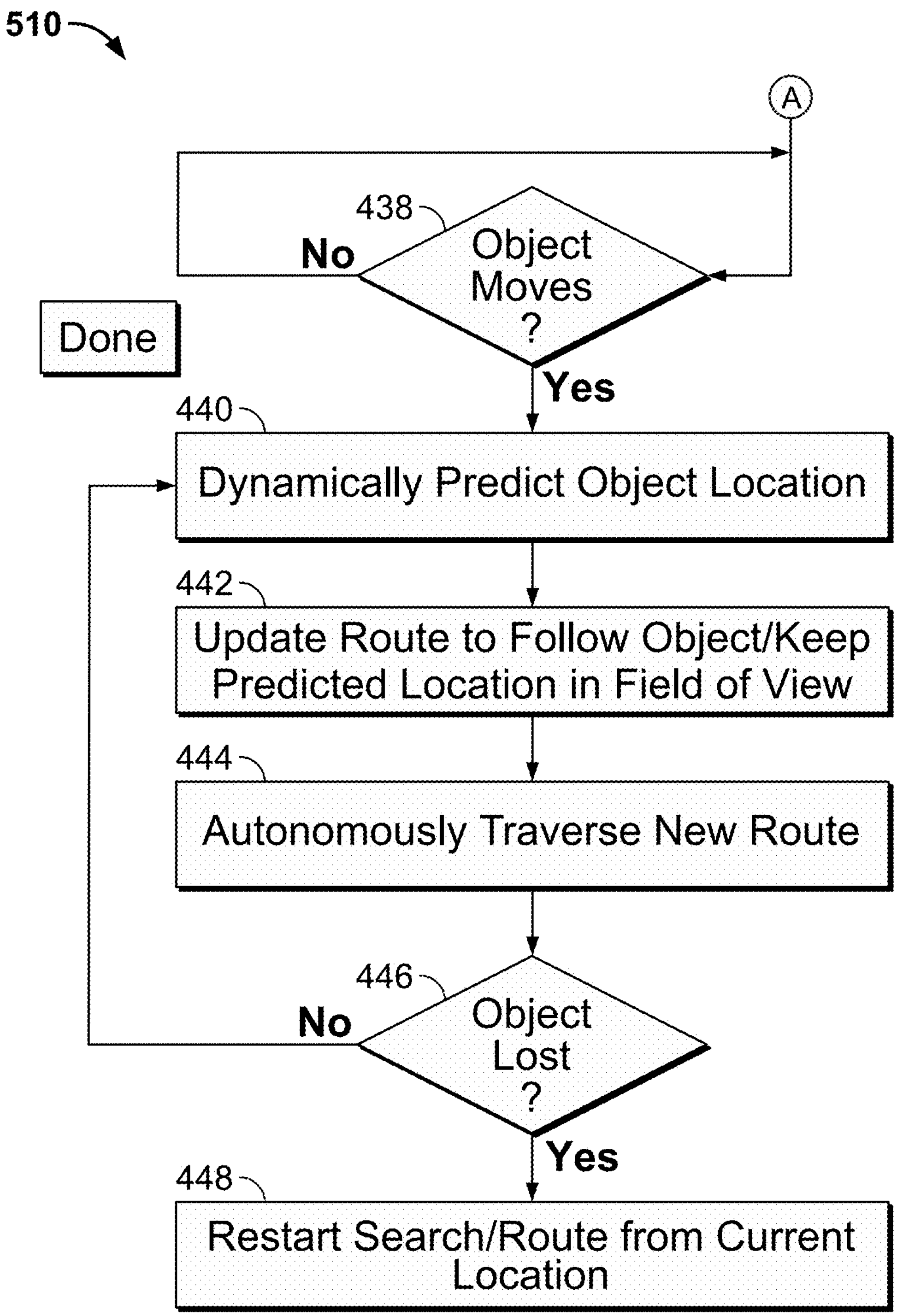
Figure 11A:
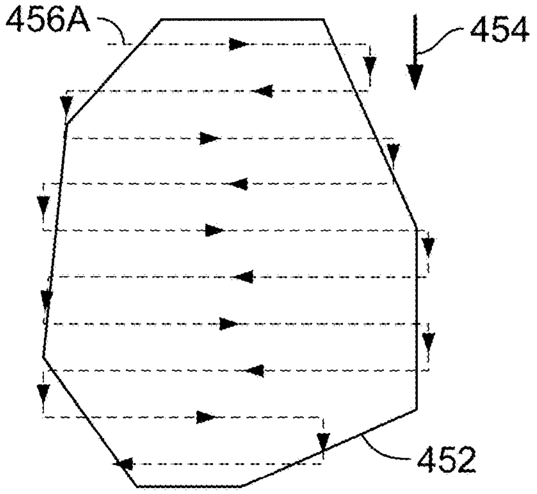
FIGS. 11A-11D depict exemplary embodiments of possible routes for searching an area for an object.
Figure 11B:
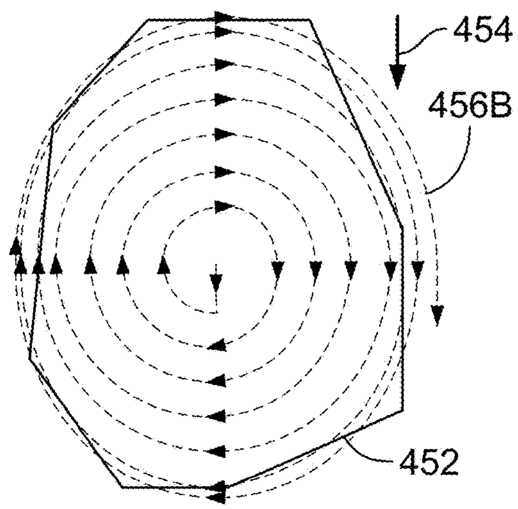
Figure 11C:
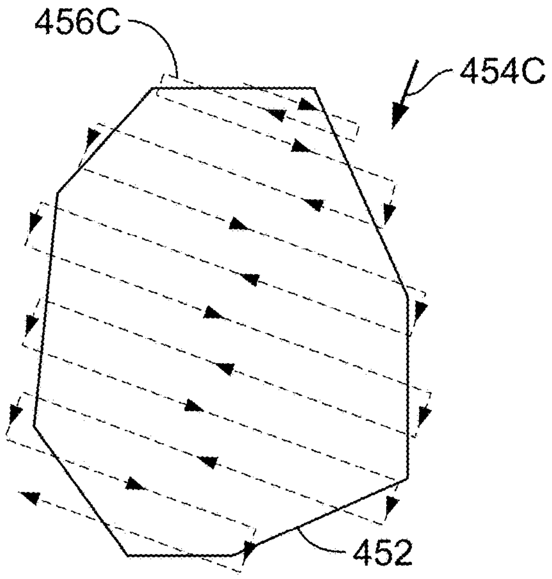
Figure 11D:
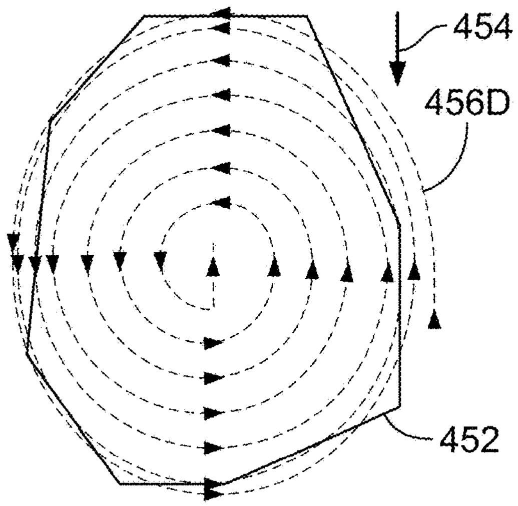

FIGS. 10A-10B depict a flow chart of an exemplary embodiment of method 420 for autonomously searching an area using an exemplary embodiment of an unmanned helicopter. Method 420 may be viewed as a particular implementation of method 400 for a specific task. For simplicity, method 420 is described in the context of control system 300 and unmanned helicopter 100A. However, method 420 may be used with other control systems and other autonomous unmanned helicopters.

A command to search a particular area is received, via 422. The area may be defined by a user clicking on a map to select a polygon of a predetermined shape, such as a rectangle or circle. Alternatively, the user may be allowed to define the desired shape. In some embodiments, the object for which unmanned helicopter 100A is searching is also defined. For example, the search may be for a person, a vehicle, a particular geographic feature, a structure or other object. Alternatively, the search may simply be considered a request to search or map a region. In such cases, images or the terrain may simply be provided as the output.

In some embodiments, the desired standoff distance and angle for the object being searched are determined by processor(s) 302, in 424. In response to, for example, the object searched for being a structure or vehicle, the distance the helicopter may search from may be further away and the angle closer to ninety degrees (vertical from the object). In contrast, in response to the object searched for being a person or animal, the standoff distance may be smaller and the angle closer to zero degrees (horizontal from the object). Information related to the geographic area is also received, in 426. For example, the wind direction and speed may be measured or received from other assets. The terrain may be determined based upon known maps of the area and/or a laser altimeter.

The desired route may be determined in 428. The route selected may be based upon external conditions such as wind and terrain as well as the object for which the search is conducted. Possible routes having similar shapes may be analyzed and the route that is optimized for the desired considerations such as the object, terrain, wind direction and time to complete a search of the entire selected region may be selected. Optimized routes of different shapes may also be compared to determine the route selected in 428. For example, FIGS. 11A-11D depict various route 456A, route 456B, route 456C, and route 456D that might be selected for a single polygon 452 provided at 402. Although specific routes are shown, these are for explanatory purposes. Routes having other shapes may be used in other embodiments. Route 456A and route 456C are lawnmower patterns that may be used to perform a search. The direction of the route 456A and route 456C have been optimized at least in part based on the directions of prevailing wind 454 and prevailing wind 454C, respectively. Route 456A and route 456C may be used to reduce the amount of time unmanned helicopter 100A flies into a headwind. Route 456B and route 456D are different spiral routes that may be selected for the same prevailing wind. Route 456B starts at a central region of polygon 452 and terminates near the perimeter. Route 456D starts at the perimeter of the polygon and terminates near the center. Route 456A, route 456B, route 456C, and route 456D selected may also be determined based on the object. For example, route 456A and route 456C might be preferred when searching for a static object. Route 456B and route 456D might be preferred when searching for a moving object. However, other considerations may be used in route selection. Further, although the distances between sections of route 456A, route 456B, route 456C, and route 456D are shown as generally equal, nothing prevents the routes from being weighted toward regions of the polygon. Similarly, although route 456A, route 456B, route 456C, and route 456D are depicting as terminating near the edges or center of polygon 452, in an alternate embodiment, the routes may start or end in other regions.

After route selection, unmanned helicopter 100A is controlled to autonomously fly the selected route while capturing images, via 430. In response to the search being merely conducted to map the region, then method 420 may terminate after 430 is completed and mapping data have been returned. In response to, however, specific object(s) being searched for, then as unmanned helicopter 100A traverses the route, the images captured in 430 may be analyzed to find the object, via 432. 432 may be performed by a compute payload and/or an artificial intelligence core. In some embodiments, image analysis is performed remotely and the results returned to unmanned helicopter 100A.

It is determined whether the desired object is recognized, via 434. In response to not being recognized, unmanned helicopter 100A continues its search in 432. In response to, however, the object being recognized or found, then notification may be provided via external communications module 150, in 436. Other responses to finding the object might also be performed in 436. In some embodiments, method 420 may terminate or unmanned helicopter 100A may search for other like objects after 436 is performed. In some embodiments, unmanned helicopter 100A is desired to track the object. Consequently, image analysis continues to determine whether the object has moved. In response to the object not moving, unmanned helicopter 100A may remain in place. In response to the object having moved, then the next location of the object is dynamically predicted, via 440. 440 may include analyzing previous images to determine the object's speed and direction. 440 thus estimates the location of the object in real time based upon inputs to control system 300.

Based on the predicted location, the route is dynamically updated by control system 300, in 442. The updates to the route ensure that the object is kept in the field of view of cameras or other sensors being used to track the object. Unmanned helicopter 100 then traverses the new, updated route in 444. This process continues as long as the object remains in sight. In response to being determined that the object has been lost from the field of view in 446, then the search may be restarted, via 448. For example, the route may be restarted from the current location. Stated differently, unmanned helicopter 100A may resume the lawnmower or spiral route from the current location. Other routes may also be selected. In addition, a notification that that the object has been lost and the last known position of the object may be provided to the user via external communications module 150.

Using method 420, unmanned helicopter 100A can easily be directed to search for objects. The search is then carried out autonomously, without requiring remote piloting. Consequently, a relatively complex task may be performed without requiring a highly skilled user. Flexibility, utility and ease of use of unmanned helicopter 100A are thus improved.

Figure 12:
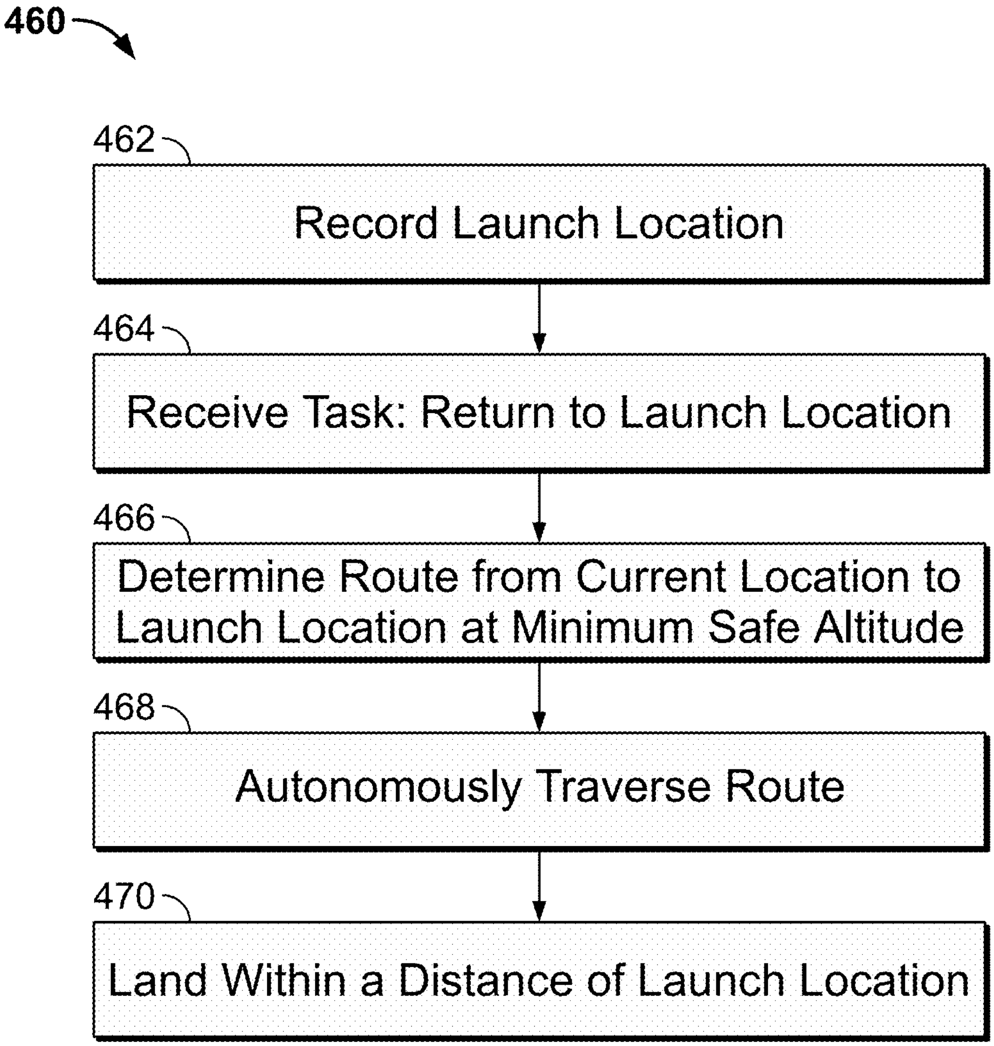
FIG. 12 is a flow chart depicting an exemplary embodiment of a method for autonomously returning home using an exemplary embodiment of an unmanned helicopter.

FIG. 12 is a flow chart depicting an exemplary embodiment of method 460 for autonomously returning home using an exemplary embodiment of an unmanned helicopter. Method 460 may be viewed as a particular implementation of method 400 for a specific task. For simplicity, method 460 is described in the context of control system 300 and unmanned helicopter 100A. However, method 460 may be used with other control systems and other autonomous unmanned helicopters.

Upon launch, unmanned helicopter 100A records the launch location, in 462. This may include recording global positioning data for the launch location. This data may be supplemented by other data including but not limited to terrain data for the launch location, a homing beacon that may be provided at the launch location or other indicators of the base for unmanned helicopter 100A.

Unmanned helicopter 100A may then be launched to perform the desired mission(s). At some time later, control system 300 receives an additional task: immediate return to the launch location, in 464. For example, the user may select this task from a menu and ensure that the command is transmitted to unmanned helicopter 100A. The task is received by processor(s) 302 via external communications 150.

Processor(s) 302 determine the route from the current location to the launch location in 466. The current location may be determined based on global positioning data and/or other information available to processor(s) 302. In some embodiments, this includes determining the minimum safe altitude at which unmanned helicopter 100A may traverse the entire route home. In some embodiments, the route determined is the shortest route between the current location and the launch location. In some embodiments, factors such as regions unmanned helicopter 100A has been directed to avoid, large geographic features, prevailing winds, locations of unfriendly assets or other considerations may be taken into account in determining the route. Unmanned helicopter 100A then autonomously traverses the route in 468 and lands within a threshold distance of the launch location at 470. As in methods 480 and 650, landing at 470 may include multiple steps as well as communication with the user to confirm the safety and desirability of the landing location.

Using method 460, unmanned helicopter 100A can simply be directed to return home. In response unmanned helicopter 100A can return home without requiring a pilot. Thus, a single user may be capable of recalling multiple unmanned helicopters substantially simultaneously. Flexibility, utility and ease of use of unmanned helicopter 100A may thus be improved.

Figure 13:
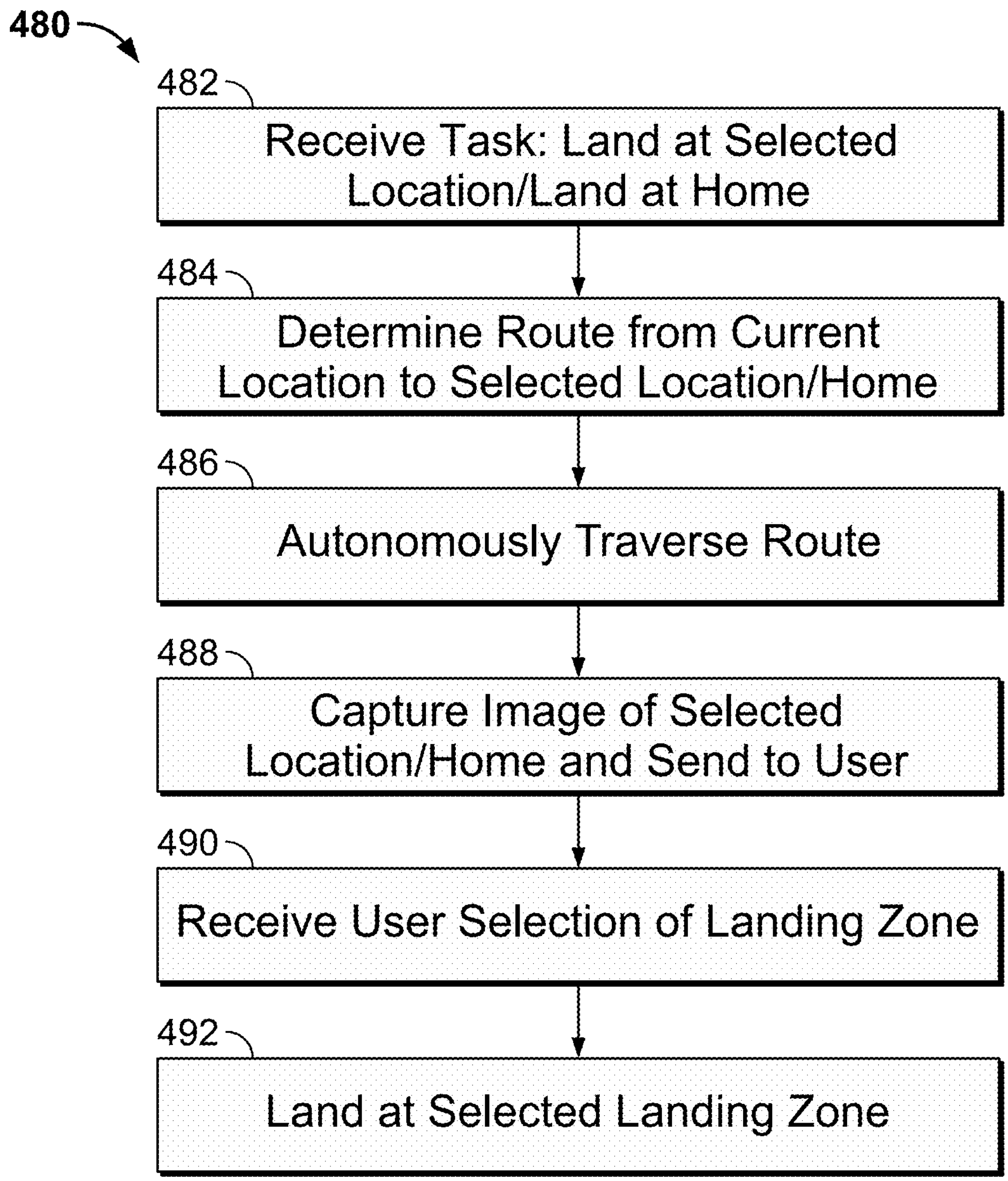
FIG. 13 is a flow chart depicting an exemplary embodiment of a method for autonomously landing an exemplary embodiment of an unmanned helicopter.

FIG. 13 is a flow chart depicting an exemplary embodiment of method 480 for autonomously landing an exemplary embodiment of an unmanned helicopter. Method 480 may be viewed as a particular implementation of method 400 for a specific task. For simplicity, method 480 is described in the context of control system 300 and unmanned helicopter 100A. However, method 480 may be used with other control systems and other autonomous unmanned helicopters.

Control system 300 receives a task: land at a selected location, in 482. For example, the user may select this task from a menu, click on the selected location on a map and ensure that the command is transmitted to unmanned helicopter 100A. The task is received by processor(s) 302 via external communications 150. The selected location may be a location near unmanned helicopter's 100A current location, may be at the home base/launch location or another location.

Processor(s) 302 determine the route from the current location to the selected location in 484. The current location may be determined based on global positioning data and/or other information available to processor(s) 302. The global positioning data may be converted to coordinates on the map to match the current location with the selected location. Similarly, the selected location may be determined by converting the map coordinates selected to global positioning coordinates transmitted with the command to land. In some embodiments, the route selection in 484 may include determining the minimum safe altitude at which unmanned helicopter 100A may traverse the entire route. In some embodiments, the route determined is the shortest route between the current location and the selected location. In other embodiments, factors may be taken into account in determining the route. Unmanned helicopter 100A then autonomously traverses the route in 486.

In response to unmanned helicopter 100A reaching the selected location, or being within a particular distance of the selected location, at least one image is captured of the selected location, in 488. 488 may include processor(s) 302 controlling a camera to point downward. In some embodiments, the image(s) provided in 488 are a video stream of the location. The image(s) are provided to the user. The user may then select a particular location in the images as the landing zone for unmanned helicopter 100A. This selection is received by processor(s) 302, at 490. Unmanned helicopter 100A then autonomously lands on the landing zone or as close to the landing zone as possible, at 492.

Using method 480, unmanned helicopter 100A can simply be directed to land at a specified location. In order to account for errors in georegistration, the landing zone is confirmed by the user via the live video/image stream at 488-490. Thus, unmanned helicopter 100A may be relatively easily directed to land substantially autonomously in a selected location.

Figure 14:
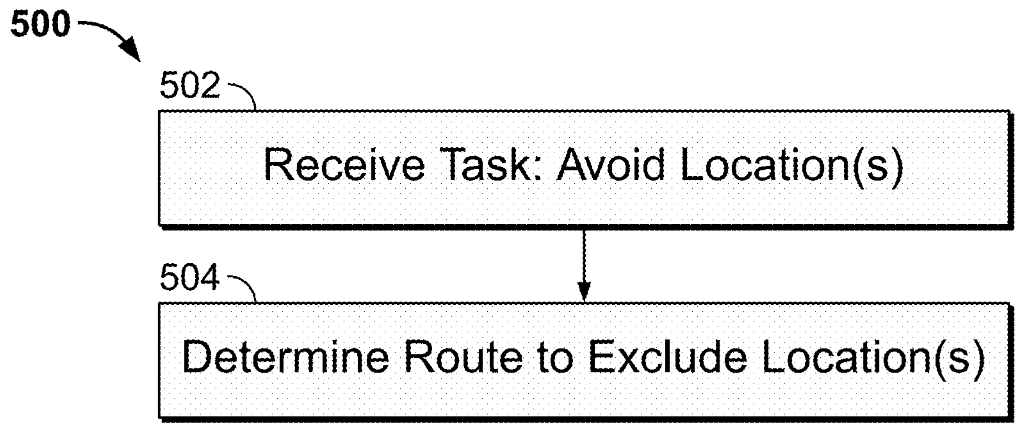
FIG. 14 is a flow chart depicting an exemplary embodiment of a method for autonomously avoiding selected area(s) while performing other tasks using an exemplary embodiment of an unmanned helicopter.

FIG. 14 is a flow chart depicting an exemplary embodiment of method 500 for autonomously avoiding selected area(s) while performing other tasks using an exemplary embodiment of an unmanned helicopter. Method 500 may be viewed as a particular implementation of method 400 for a specific task. For simplicity, method 500 is described in the context of control system 300 and unmanned helicopter 100A. However, method 500 may be used with other control systems and other autonomous unmanned helicopters. Further, the task described in method 500 is typically used in conjunction with other tasks, such as searching for or following objects.

Processor(s) 302 receive a command to avoid selected location(s), in 502. For example, the user may select from predetermined areas or may define polygons which unmanned helicopter 100A is desired to avoid. This command may be received prior to or after launch. When calculating the route(s) to perform a task, the processor(s) ensure that the route excludes the selected locations, via 504.

Using method 500, unmanned helicopter 100A can simply be directed to avoid particular regions. When subsequently determining routes to perform various tasks, unmanned helicopter 100A ensures that the route does not include these locations. Thus, a pilot need not be aware of updated locations to avoid and ensure that unmanned helicopter 100A is piloted around these locations. Consequently, use of unmanned helicopter 100A may be facilitated.

Figure 15:
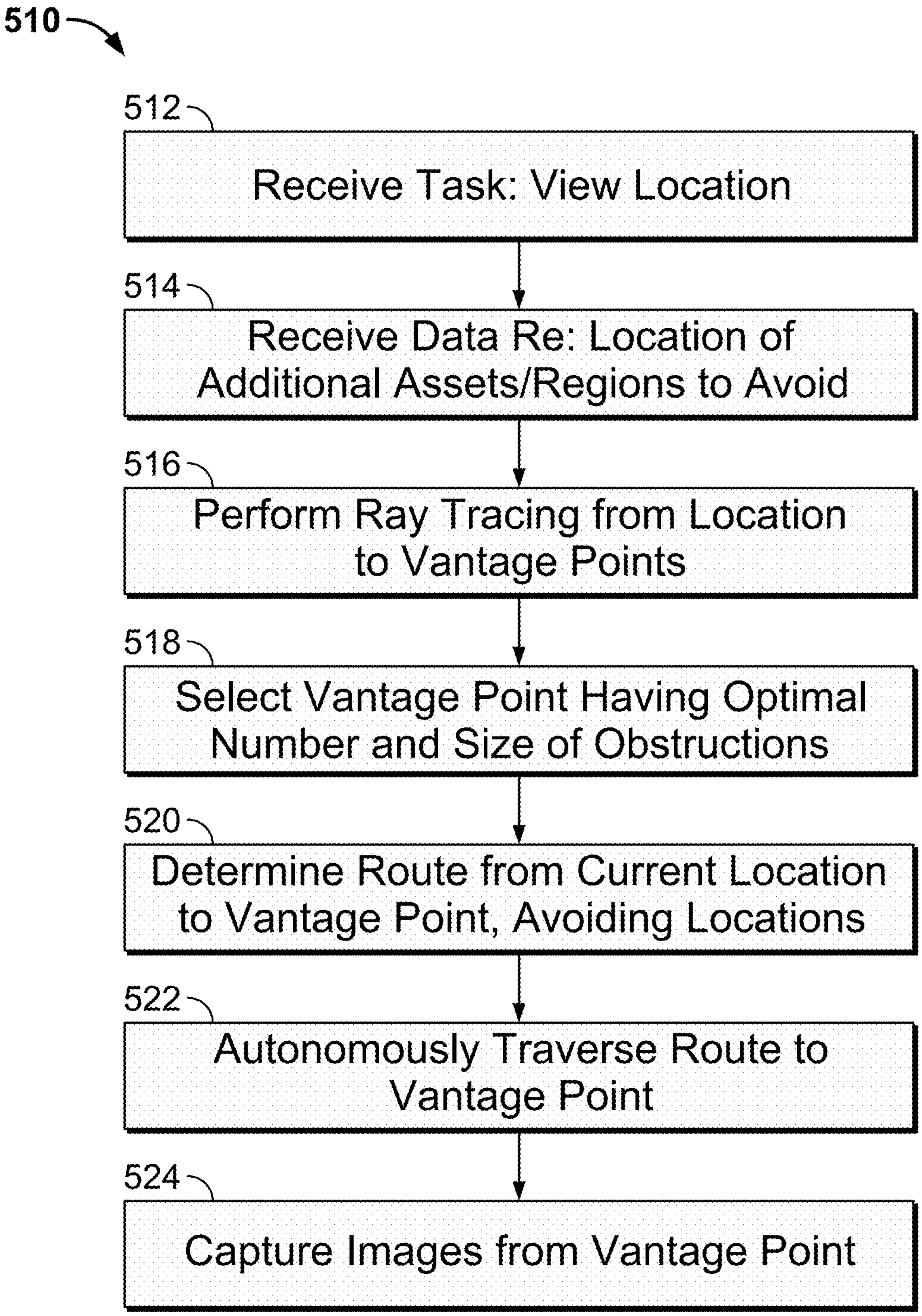
FIG. 15 is a flow chart depicting an exemplary embodiment of a method for autonomously capturing images of an object using an exemplary embodiment of an unmanned helicopter.

FIG. 15 is a flow chart depicting an exemplary embodiment of method 510 for autonomously capturing images of an object using an exemplary embodiment of an unmanned helicopter. Method 510 may be viewed as a particular implementation of method 400 for a specific task. For simplicity, method 510 is described in the context of control system 300 and unmanned helicopter 100A. However, method 510 may be used with other control systems and other autonomous unmanned helicopters.

Processor(s) 302 receive a command to view a particular location, in 512. For example, a user may select a location on a map and choose "view location" from a menu. This command is transmitted and received by communications module 150 and provided to processor(s) 302.

In some embodiments, the location(s) of additional assets monitoring the location and regions to avoid are received, via 514. The location(s) of additional assets may allow the processor(s) to select the optimal vantage point for the location not already covered by other available assets as well as to plot a route that does not intersect with the assets.

Ray tracing is performed from the selected location to possible vantage point(s) for the imaging system such as cameras, via 516. 516 utilizes terrain data as well as information regarding other visual obstructions. The ray tracing of 516 thus indicates a number and size of obstructions between the possible vantage point(s) and the location. The identification or possible vantage point may also include determining a desired standoff distance and angle for the location. The desirability of unmanned helicopter 100A remaining undetected is also a consideration in determining the possible vantage points.

A vantage point having an optimal number and an optimal size of obstructions given other limitations such as detectability of unmanned helicopter 100A is selected, via 518. A route from the current location to the vantage point is then determined, in 520. The route selected in 520 may account for the locations desired to be avoided, locations of other assets, weather conditions, time to traverse the route and other factors that may be specified. Unmanned helicopter 100A is then autonomously controlled to fly this route to the vantage point and capture images of the location from the vantage point in 524. The image(s) captured may be stills, a live video feed or other surveillance data. In some embodiments, the images capture may use radar or other radiation outside of the visible spectrum.

Using method 510, unmanned helicopter 100A can easily be directed to view a particular location. The surveillance is then carried out autonomously. Consequently, a relatively complex task may be performed without requiring a highly skilled user. Further, the user may direct multiple unmanned helicopters 100A to view the same location. Because unmanned helicopters 100A are aware of other assets in the area, they may provide different imaging data. Flexibility, performance and ease of use of unmanned helicopter 100A may thus be improved.

Figure 16:
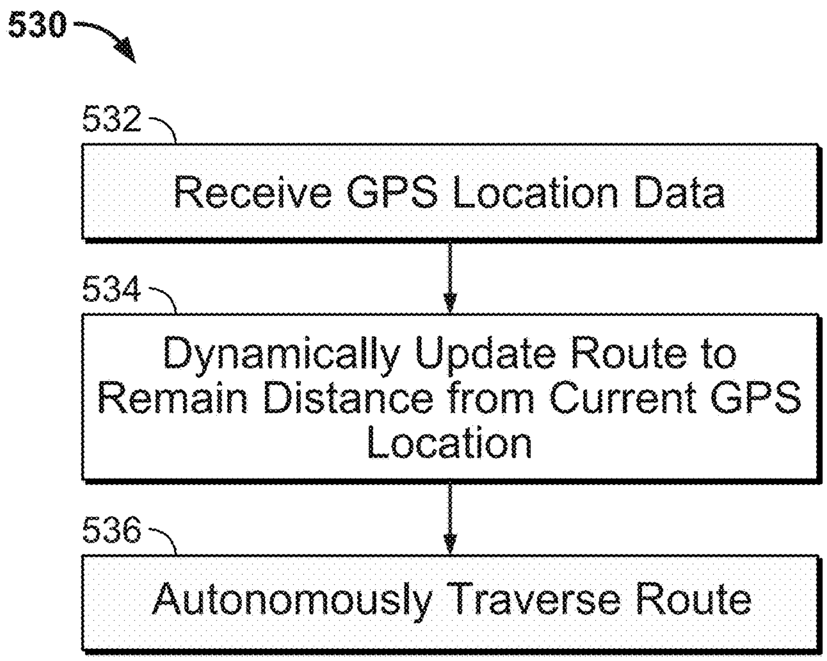
FIG. 16 is a flow chart depicting an exemplary embodiment of a method for autonomously following an object emitting a signal using an exemplary embodiment of an unmanned helicopter.

FIG. 16 is a flow chart depicting an exemplary embodiment of method 530 for autonomously following an object emitting a signal using an exemplary embodiment of an unmanned helicopter. Method 530 may be viewed as a particular implementation of method 400 for a specific task. For simplicity, method 530 is described in the context of control system 300 and unmanned helicopter 100A. However, method 530 may be used with other control systems and other autonomous unmanned helicopters. In the example shown, method 530 commences after the command to track a particular object emitting a signal is received by processor(s) 302. Method 530 may also be viewed as being repeated at intervals, or substantially continuously, during tracking of the object.

The location data is received from the object in 532. For example, the global positioning signal emitted from a particular phone may be received in 532. In other embodiments, other location data emitted by the object may be received in lieu of or in addition to the global positioning data. Processor(s) 302 dynamically update the route in real time such that unmanned helicopter 100A remains within a particular distance of the signal in 534. For example, 534 may include estimating the next location of the object based upon the speed and direction calculated using previous global positioning data. Unmanned helicopter 100A may then be autonomously controlled by processor(s) 302 to fly the route, via 536.

Using method 530, unmanned helicopter 100A can be directed to follow a particular signal. Unmanned helicopter 100A may then autonomously follow the signal without requiring user intervention. Flexibility, performance and ease of use of unmanned helicopter 100A may thus be improved.

Figure 17:
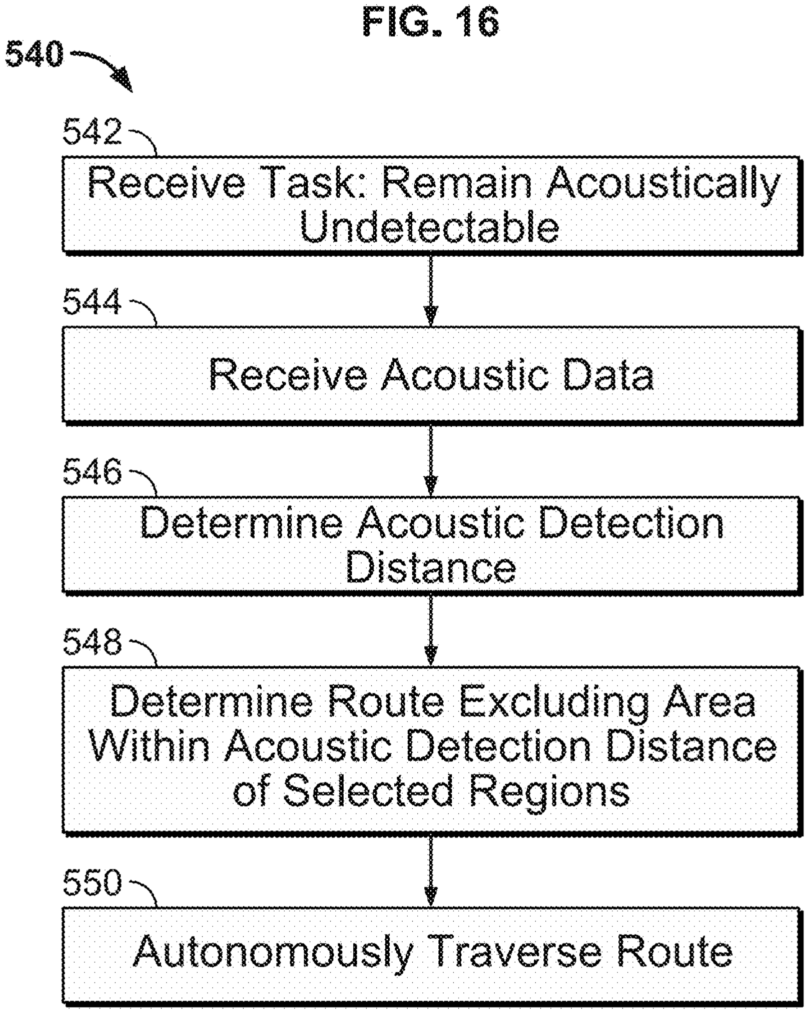
FIG. 17 is a flow chart depicting an exemplary embodiment of a method for autonomously remaining acoustically undetectable using an exemplary embodiment of an unmanned helicopter.

FIG. 17 is a flow chart depicting an exemplary embodiment of method 540 for autonomously remaining acoustically undetectable using an exemplary embodiment of an unmanned helicopter. Method 540 may be viewed as a particular implementation of method 400 for a specific task. For simplicity, method 540 is described in the context of control system 300 and unmanned helicopter 100A. However, method 530 may be used with other control systems and other autonomous unmanned helicopters.

Processor(s) 302 receive a command indicating at least one region including human observers and that unmanned helicopter 100A is to remain acoustically undetectable to human observers in the region, via 542. A user may a select a predefined region for 542, or may define the region in another manner. For example, the user may define polygon on a map and indicate that unmanned helicopter 100A is to remain acoustically undetectable to people in this region.

Acoustic data may be received in 544. For example, weather conditions such as wind speed in the defined regions, the acoustic profile of unmanned helicopter 100A and other data relating to audio detection may be received in 544. Processor(s) 302 determine an acoustic detection distance based upon the acoustic signature for unmanned helicopter 100A and weather conditions such as wind direction and wind speed, in 546. Other factors such as the altitude of unmanned helicopter 100A may also be accounted for in determining the acoustic detection distance. The acoustic detection distance is the distance away from the regions unmanned helicopter 100A is desired to remain in order to avoid detection. This distance may include horizontal (along the surface of the terrain) and vertical components.

A route is automatically determined, via 548. The route excludes an area including the region(s) identified by the user and the acoustic detection distance around each region. Processor(s) 302/flight control electronics 112 control unmanned helicopter 100A to autonomously fly the route, via 550.

Using method 540, unmanned helicopter 100A can traverse a route while remaining acoustically undetectable. Thus, unmanned helicopter 100A may perform surveillance without the subject's knowledge and without requiring piloting. Consequently, performance of unmanned helicopter 100A may be improved.

Figure 18:
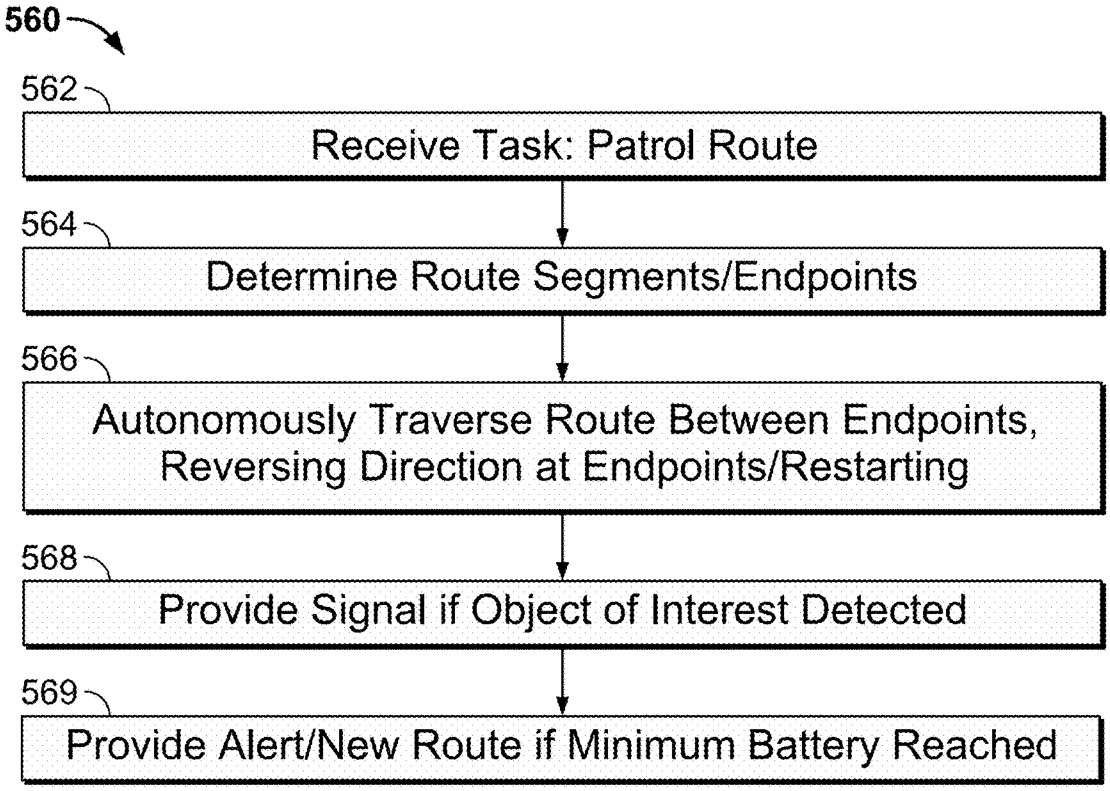
FIG. 18 is a flow chart depicting an exemplary embodiment of a method for autonomously patrolling a route using an exemplary embodiment of an unmanned helicopter.

FIG. 18 is a flow chart depicting an exemplary embodiment of method 560 for autonomously patrolling a route using an exemplary embodiment of an unmanned helicopter. Method 560 may be viewed as a particular implementation of method 400 for a specific task. For simplicity, method 560 is described in the context of control system 300 and unmanned helicopter 100A. However, method 560 may be used with other control systems and other autonomous unmanned helicopters.

Processor(s) 302 receive a command indicating that unmanned helicopter 100A is to patrol a particular route, via 562. The patrol may be desired to be along a road or trail, around a perimeter or covering another region. The user may select segments of the road or perimeter to traverse. For example, the user may define polygon on a map or a series of line segment corresponding to the road or perimeter. The endpoints of the perimeter or line segments/road may also be indicated. This information is transmitted to the external communications module 150.

Processor(s) 302 determine the route to traverse the path between of the plurality of endpoints or around the perimeter, via 564. The route indicates that the direction is reversed at each of the plurality of endpoints or that the route around the perimeter is restarted upon reaching the endpoint. Processor(s) 302/flight electronics 112 control unmanned helicopter 100A to autonomously traverse the route, via 566. In response to the route being a series of line segments having endpoints, then unmanned helicopter 100A changes direction upon reaching each endpoint. In response to the route being a closed line such as a perimeter, then upon reaching the start/end point, the route is restarted. Thus, the desired path is autonomously patrolled.

In response to an object of interest being detected then a signal is provided via the external communications module 150, in 568. Additional actions may also be specified and taken in 568. For example, upon intruder detection, the user may be notified via communications module 150 and the intruder warned using a megaphone or other analogous payload. Thus, the user is made aware of any intruders or other issues along the path being patrolled. In some embodiments, the battery level may also be monitored as part of method 560. In such an embodiment, the user may be alerted upon battery 186 and battery 188 reaching a minimum energy level to return home in 569. As part of this, processor(s) 302 may redetermine the route to be from the current location to a home location. Consequently, unmanned helicopter 100A can return from patrol. In some embodiments, as discussed below, unmanned helicopter 100A may also hand off patrol duties to another, drone to provide continuous monitoring.

Using method 560, unmanned helicopter 100A can autonomously patrol a desired region, alerting the user of any issues and return prior to running out of battery. Consequently, humans need not patrol either in person or by piloting a drone. Instead, unmanned helicopter 100A can perform these duties.

Figure 19:
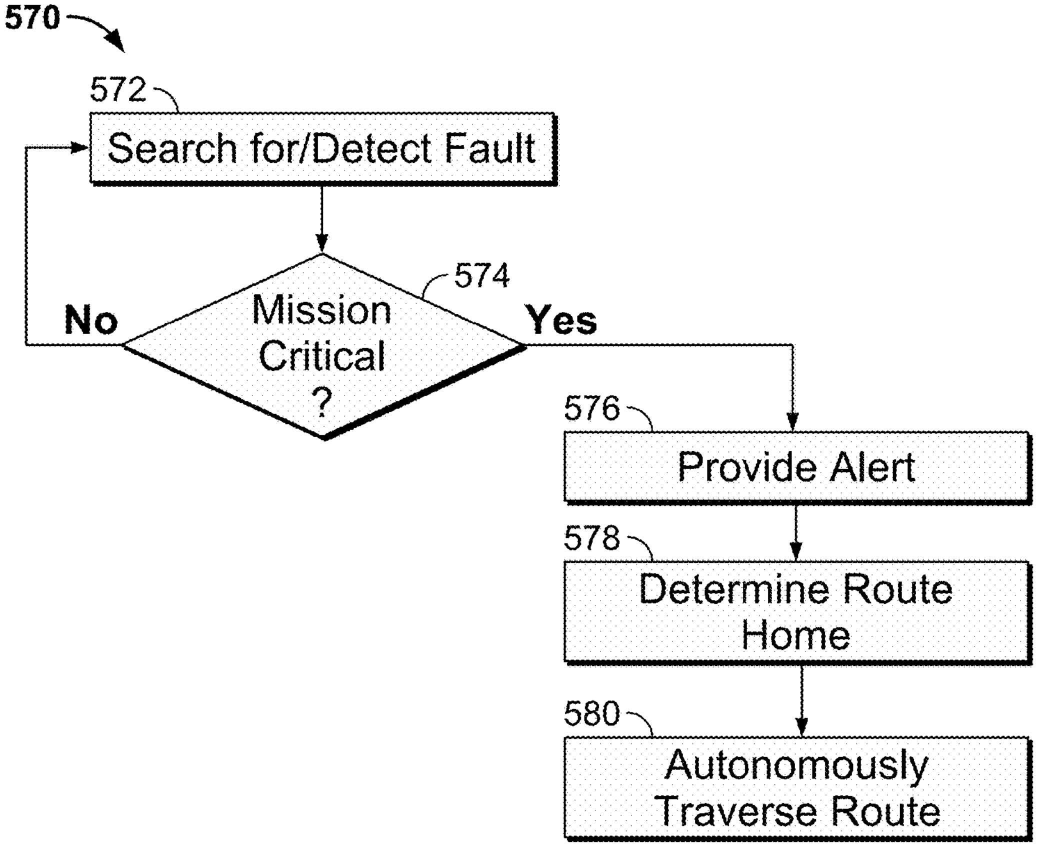
FIG. 19 is a flow chart depicting an exemplary embodiment of a method for autonomously responding to faults using an exemplary embodiment of an unmanned helicopter.

FIG. 19 is a flow chart depicting an exemplary embodiment of method 570 for autonomously responding to faults using an exemplary embodiment of an unmanned helicopter. Method 570 may be viewed as a particular implementation of the method 400 for a specific task. For simplicity, Method 570 is described in the context of control system 300 and unmanned helicopter 100A. However, method 570 may be used with other control systems and other autonomous unmanned helicopters. In some embodiments, the task performed by method 570, responding to system faults, is always implemented. Consequently, the task need not be received from the user to processor(s) 302. Alternatively, this task may be required to be received from the user in order to be performed.

Control system 300 searches for faults in the components of unmanned helicopter 100A, via 572. For example, faults in one or more of the battery system (e.g. battery 186 and battery 188), power system that regulates power from the battery 186 and battery 188, propulsion system (e.g. motor 136 and motor 146 and rotors 134 and rotor 142), flight control system 112, and communications system 150 may be detected.

In response to such a fault being detected, it is determined whether the fault is mission critical, in 574. Mission critical faults may include any fault that may prevent completion of the current mission(s). Such faults might include a catastrophic failure of the battery or flight control system which would impact any activity performed by unmanned helicopter 100A. Alternatively, the mission critical fault may be specific to the mission(s) being carried out. For a search mission, such faults might include failures of the camera or other detection components.

In response to the fault detected being not mission critical, then operation continues. In some embodiments, a notification of the fault is provided. If, however, the flight is mission critical, then an alert is provided, in 576. For example, the alert might be send via the mesh radio that is part of the external communications module 150. Consequently, an operator is notified that a significant fault has occurred. An additional drone might be called to replace unmanned helicopter 100A, as discussed below for method 590.

The route between current location of unmanned helicopter 100A and the home/launch location is automatically determined by processor(s) 302, in 578. Unmanned helicopter 100A is then autonomously flown along the route to return home, in 580.

Using the method 570 and control system 300 of unmanned helicopter 100A, unmanned helicopter 100A may be automatically checked for faults during operation and returned home in response to a mission critical faults existing or being detected. Consequently, reliability of unmanned helicopter 100A is improved.

Figure 20:
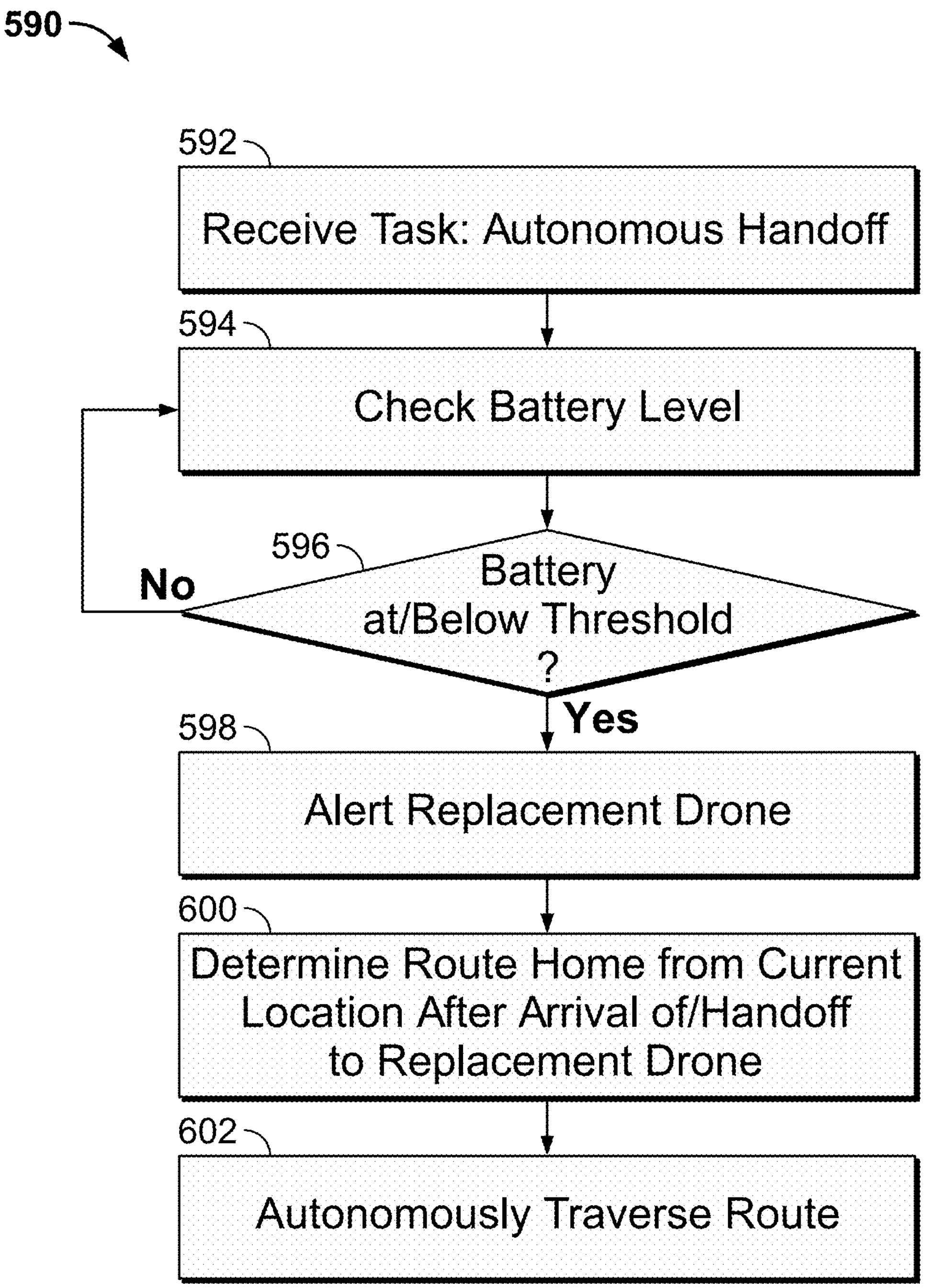
FIG. 20 is a flow chart depicting an exemplary embodiment of a method for autonomously handing off duties to another drone using an exemplary embodiment of an unmanned helicopter.

FIG. 20 is a flow chart depicting an exemplary embodiment of method 590 for autonomously handing off duties to another drone using an exemplary embodiment of an unmanned helicopter. Method 590 may be viewed as a particular implementation of method 400 for a specific task. For simplicity, method 590 is described in the context of control system 300 and unmanned helicopter 100A. However, method 590 may be used with other control systems and other autonomous unmanned helicopters.

Processor(s) 302 receive a command indicating that unmanned helicopter 100A is to autonomously hand off duties to other drone(s), via 592. Unmanned helicopter 100A may be the first helicopter to receive the command. In response to being the first helicopter to receive the command, the task may be provided by the user to the helicopter. In response to unmanned helicopter 100A not being the first, then unmanned helicopter 100A may receive the task from another helicopter. In such a case, unmanned helicopter 100A relieves another helicopter at the start of method 590.

Unmanned helicopter 100A performs the desired task(s). For example, unmanned helicopter 100A may patrol as discussed for method 560, follow an object emitting a signal as in method 530, perform a search as in method 420 and/or perform other duties. During operation, the battery level(s) are checked, via 594. Thus, the stored charge in battery 186 and/or battery 188 is monitored.

It is determined whether the battery level is at or below a particular threshold, in 596. This threshold might be the minimum battery level to return to base or may be another level. In response to the battery being above the threshold, then monitoring continues in 594. In response to the battery being below at or below the threshold, then an alert is sent to replacement drone(s), via 598. In 598, unmanned helicopter 100A may communicate with a central base, which then alerts an available drone. Alternatively, the alert may be provided directly from unmanned helicopter 100A to replacement(s). For example, the replacement drone and unmanned helicopter 100A may be part of the same mesh network. The replacement(s) may be notified directly via the mesh network. The replacement obtained in 598 may be substantially the same as unmanned helicopter 100A or may be a different drone.

Operation continues until the replacement arrives. The route home from the current location is determined by processor(s) 302 after the replacement has been on site, in 600. In some embodiments, the replacement follows unmanned helicopter 100A for a predetermined time before recalculation of the route in 600. Determination of the route in 600 may include optimizing the battery power used. For example, the route may use a minimum safe altitude and/or minimize flight time given limitations on speed.

Processor(s) 302/flight electronics 112 control unmanned helicopter 100A to autonomously traverse the route, via 602. Thus, unmanned helicopter 100A has successfully handed off its duties to another drone.

Using the method 590 and control system 300, duties may be automatically handed off between drones. Thus, uninterrupted coverage or the functions of unmanned helicopter 100A may be provided. Consequently, performance of unmanned helicopter 100A implementing method 590 may be improved.

Figure 21:
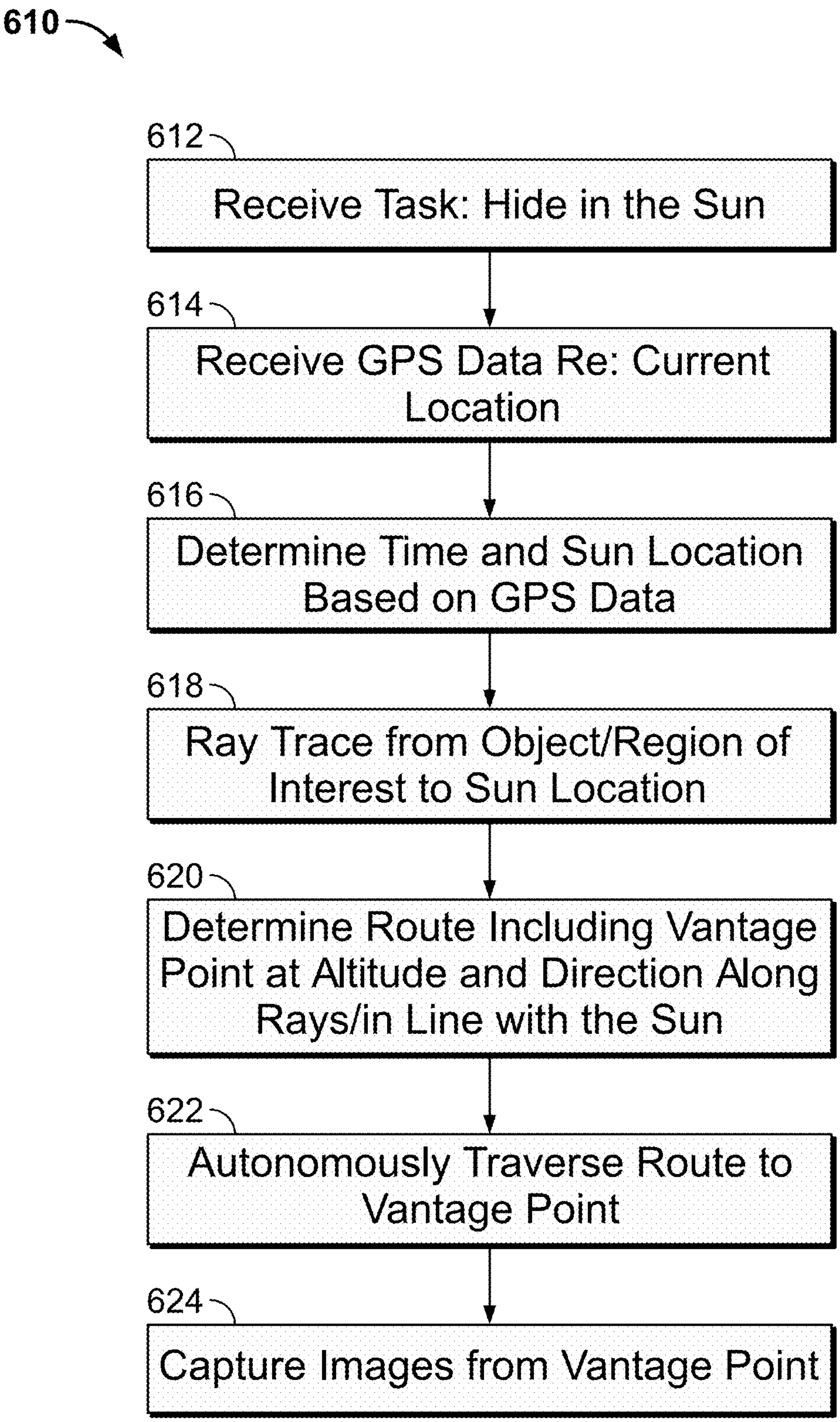
FIG. 21 is a flow chart depicting an exemplary embodiment of a method for autonomously remaining obscured by the sun while surveilling an object using an exemplary embodiment of an unmanned helicopter.

FIG. 21 is a flow chart depicting an exemplary embodiment of method 610 for autonomously remaining obscured by the sun while surveilling an object using an exemplary embodiment of an unmanned helicopter. Method 610 may be viewed as a particular implementation of method 400 for a specific task. For simplicity, method 610 is described in the context of control system 300 and unmanned helicopter 100A. However, method 610 may be used with other control systems and other autonomous unmanned helicopters.

Processor(s) 302 receive a command indicating that unmanned helicopter 100A is to use the sun to remain visually undetectable, via 612. The processor(s) 302 may receive this command while on another mission, such as surveilling a location in method 510 and/or remaining acoustically undetectable using method 540.

Global positioning data and/or analogous data for the current location are received, via 614. The data received in 614 may indicate the geographic location and time. The object(s) and/or regions from which unmanned helicopter 100A is desired to be visually obscured may also be provided. Based on the data provided in 614, the current time and location of the sun are determined in 616.

Ray tracing between the object and/or region from which unmanned helicopter 100A is desired to be obscured is performed, via 618. Consequently, a region in which unmanned helicopter 100A can fly while being concealed by the sun can be determined. The ability of the sun to obscure unmanned helicopter 100A depends upon the size of unmanned helicopter 100A as well as its distance from the object/region of interest. Stated differently, the ability of unmanned helicopter 100A to be concealed by the sun depends on the solid angle subtended by unmanned helicopter 100A. The relatively small profile of unmanned helicopter 100A, as shown in FIG. 1D, aids in maintaining a small solid angle.

The route is then determined in 620. The route includes a vantage point having an altitude and direction from the object/region which allow unmanned helicopter 100A to be positioned on the line between the sun and the object/region. The route to the vantage point may be selected to reduce visibility of unmanned helicopter 100A during transit. Processor(s) 302/flight electronics 112 control unmanned helicopter 100A to autonomously traverse the route to the vantage, via 622. Images of the object/area of interest may then be captured from the vantage point in 624.

In some embodiments, the object may move during method 610. In such embodiments, the sun's position, object's position, vantage point and route from a current location to the new vantage point may be dynamically updated in real time. In some cases. the object does not move during method 610, but the sun may. In such cases, the sun's position, vantage point and route from the current vantage point to a new vantage point dynamically updated in real time. Thus, method 610 may be used to keep unmanned helicopter 100A hidden in the sun throughout most or all of the mission.

Using method 610 and control system 300, unmanned helicopter 100A may autonomously remain concealed while performing other tasks. Consequently, the method 610 may allow unmanned helicopter 100A to better accomplish missions such as surveillance, searches, or following object(s). Consequently, performance of unmanned helicopter 100A implementing method 610 may be improved.

Figure 22:
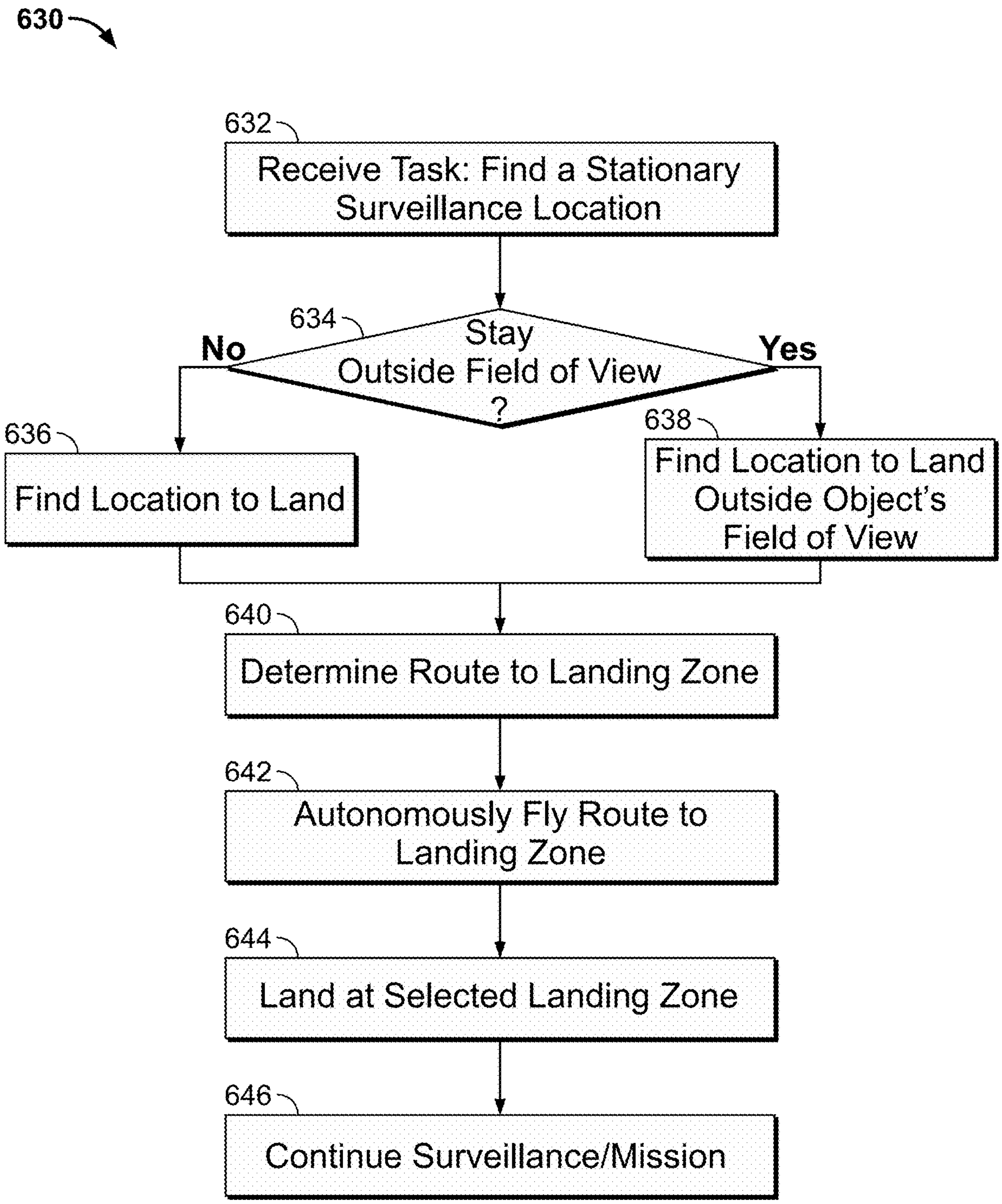
FIG. 22 is a flow chart depicting an exemplary embodiment of a method for performing part of a mission from a stationary location using an exemplary embodiment of an unmanned helicopter.

FIG. 22 is a flow chart depicting an exemplary embodiment of method 630 for performing part of a mission from a stationary location using an exemplary embodiment of an unmanned helicopter. Method 630 may be viewed as a particular implementation of method 400 for a specific task. For simplicity, method 630 is described in the context of control system 300 and unmanned helicopter 100A. However, method 630 may be used with other control systems and other autonomous unmanned helicopters.

Processor(s) 302 receive a command indicating that unmanned helicopter 100A is to find a stationary location to continue surveillance, via 632. The processor(s) 302 may receive this command while on another mission. For example, unmanned helicopter 100A may be searching for and following an object in method 420 or surveilling a location in method 510 while remaining acoustically undetectable using method 540 and/or hiding in the sun using method 610. The command may be received at 632 from an operator via external communications module 150 or in response to an internal indication that landing may be desirable. Landing may be desirable, for example to conserve battery power in response to an observed object remaining stationary for a particular amount of time or due to a fault.

The processor(s) 302 determine whether unmanned helicopter 100A is to stay outside the current field of view of the object/region, at 634. This determination may be made based on mission parameters. For example, in response to unmanned helicopter 100A having already received direction to hide in the sun, remain camouflaged, and/or remain acoustically undetectable, it may be determined at 634 that unmanned helicopter 100A is to stay outside the field of view of the object/location. The operator may also specify whether unmanned helicopter 100A is to stay outside the field of view/hidden, for example in the task received at 632.

In response to unmanned helicopter 100A needing not to stay outside the field of view, any suitable location to land may be found, via 636. In response to unmanned helicopter 100A staying outside the field of view/hidden, suitable location(s) outside of the object's or location's field of view may be determined, at 638. For example, the location may be relatively distant, vertically offset from the object or location and/or partially obscured. In some embodiments, 636 and 638 include providing multiple possible landing sites to the operator and receiving from the operator a selection of the desired landing site.

The route to the landing site is then determined in 640. The route to the landing site may be selected to reduce visibility of unmanned helicopter 100A during transit. Processor(s) 302/flight electronics 112 control unmanned helicopter 100A to autonomously traverse the route to the vantage, via 642. Unmanned helicopter 100A lands within a predetermined distance of the selected landing site, via 644. At 644, the landing site may be updated, for example using the method 650, and unmanned helicopter 100A lands. The mission may then be continued while unmanned helicopter 100A is stationary, at 646. For example, unmanned helicopter may continue video or audio surveillance of a particular target.

Using method 650 and control system 300, unmanned helicopter 100A may autonomously continue surveillance from a stationary location or simply conserve power while an object being followed remains stationary. This allows unmanned helicopter 100A to conserve battery power so that the mission may continue for a longer period of time. It may also allow unmanned helicopter 100A to stay on the mission even in response to battery power being low or a non-mission critical fault being detected. Although not indicated in FIG. 22, in response to the object starting to move, unmanned helicopter 100A may take off and continue following the object or otherwise continue operating. Consequently, method 630 may allow unmanned helicopter 100A to better complete missions such as surveillance, searches, or following object(s). Consequently, performance of unmanned helicopter 100A implementing method 630 may be improved.

Figure 23:
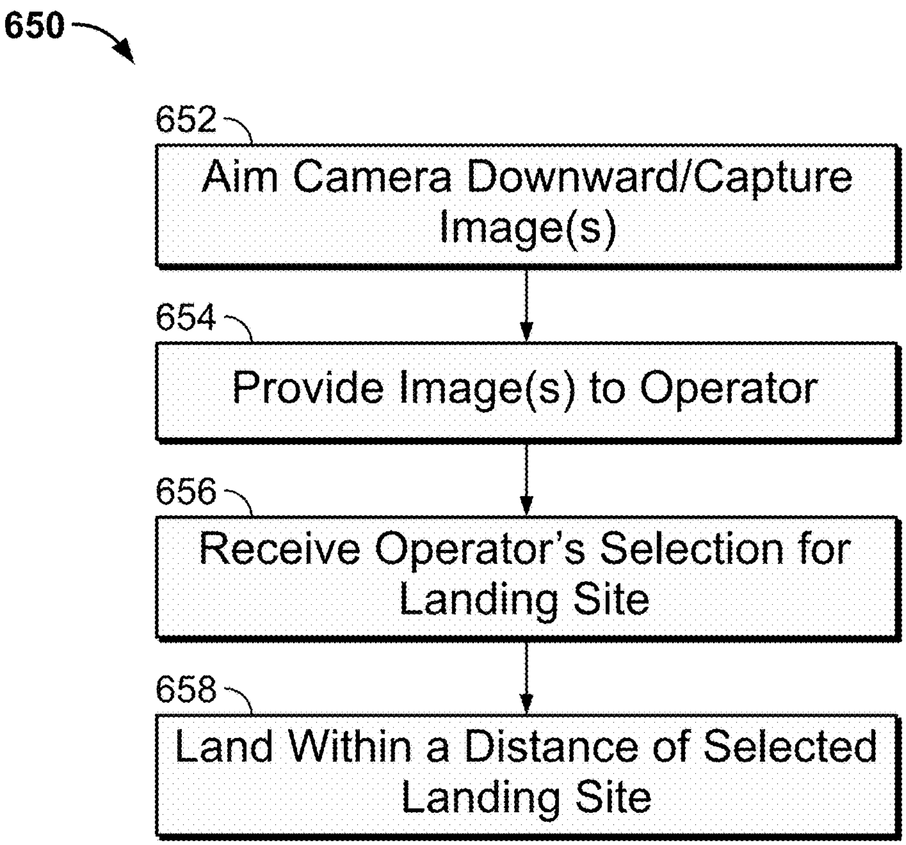
FIG. 23 is a flow chart depicting an exemplary embodiment of a method for autonomously landing at a user-selected landing site using an exemplary embodiment of an unmanned helicopter.

FIG. 23 is a flow chart depicting an exemplary embodiment of method 650 for autonomously landing at a user-selected location using an exemplary embodiment of an unmanned helicopter. Method 650 may be viewed as a particular implementation of method 400 for a specific task. For simplicity, method 650 is described in the context of control system 300 and unmanned helicopter 100A. However, method 650 may be used with other control systems and other autonomous unmanned helicopters. Method 650 starts when unmanned helicopter 100A is to land. For example, method 650 may be used in connection with one or more of the methods 460, 480, 570, 590 and/or 640.

One or more cameras carried on unmanned helicopter 100A are pointed toward the ground, at 652. This operation may be performed in response to unmanned helicopter 100A reaching a selected landing site, or being within a particular distance of the selected landing site. The camera is moved with respect to a portion of unmanned helicopter 100A, such as fuselage 110. For example, the camera may be connected to one or more motorized gimbals that control the orientation of the camera with respect to fuselage 110. Processor(s) 302 control the motors to aim the camera at a region in which unmanned helicopter 100A is desired to land. Also at 652, image(s) are captured of the area around the landing site. In some embodiments, a wide angle view of the region under unmanned helicopter 100A is captured so that the terrain of the region may be evaluated.

The image(s) are provided to the operator, via 654. In some embodiments, the image(s) provided in 654 are a video stream in real time. The images may be sent using external communications module 150. The operator may then select a particular location as the landing zone for unmanned helicopter 100A. For example, the operator may select a particular location in the image(s) by moving a pointer to the location on a display and clicking. This selection is received by processor(s) 302, at 656. The selection may be received at external communications module 105 and provided to processor(s) 302. Unmanned helicopter 100A then autonomously lands on the landing zone or as close to the landing zone as possible, at 658.

Using method 650, unmanned helicopter 100A can land at a specified area. The landing site is confirmed by the operator via the images provided at 654. Thus, unmanned helicopter 100A may be relatively easily directed to land substantially autonomously in a selected location.

Figure 24:
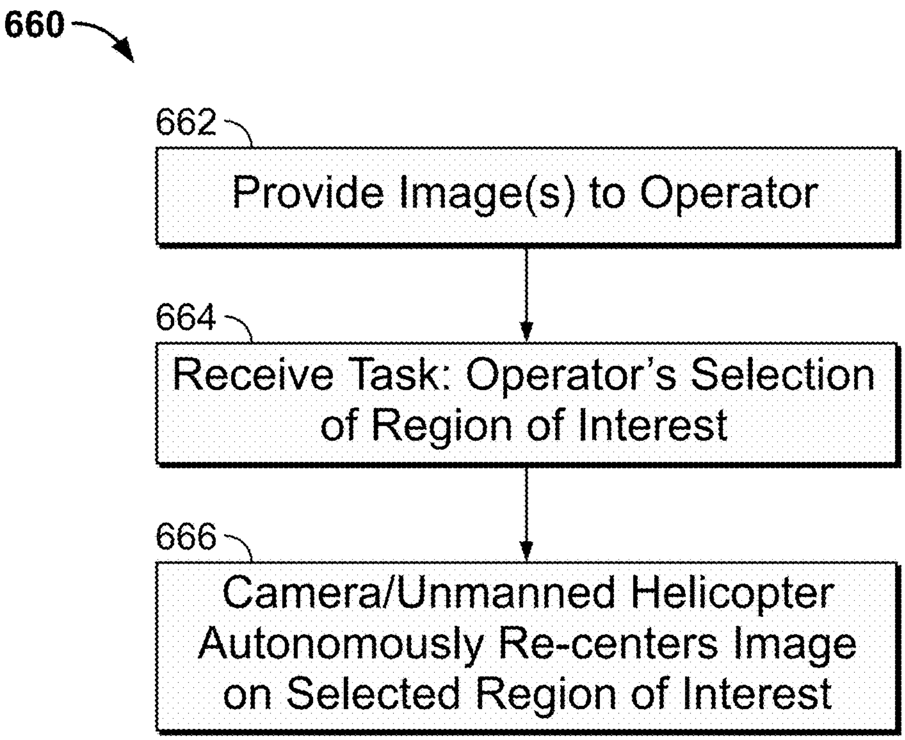
FIG. 24 is a flow chart depicting an exemplary embodiment of a method for autonomously centering a region of interest for an image using an exemplary embodiment of an unmanned helicopter.

FIG. 24 is a flow chart depicting an exemplary embodiment of method 660 for autonomously centering a region of interest for an image using an exemplary embodiment of an unmanned helicopter. Method 660 may be viewed as a particular implementation of method 400 for a specific task. For simplicity, method 660 is described in the context of control system 300 and unmanned helicopter 100A. However, method 660 may be used with other control systems and other autonomous unmanned helicopters. Method 660 is typically performed while unmanned helicopter 100A is on a mission, for example, searching for an object in method 420 or following an object in method 530.

Images are provided to the operator, at 662. For example, images may be sent via external communications module 150 to an operator's computing device, which renders the images on a display. Images provided in 662 may be a video feed. However, nothing prevents still images from being provided to the user.

Processor(s) 302 receive a command indicating that a particular portion of the image is of interest, in 664. The command may be received at 664 through external communications module 150. An operator may initiate the command by moving a pointer to a particular location on the images shown on their computing device's display and clicking. The indication of this location is provided to unmanned helicopter 100A.

Unmanned helicopter 100A is autonomously controlled such that the location selected by the use is substantially centered on the display, via 666. This may include control of both the camera(s) capturing images and flight of unmanned helicopter 100A. The camera, such as carried using payload 182, may be moved to point such that the location selected is substantially at the center of the field of view of the camera. At 666 processor(s) 302 may also control the flight of unmanned helicopter 100A to stabilize the camera and/or otherwise aid in ensuring that the location selected by the operator is substantially centered in the field of view of the images provided to the operator.

Using method 660, the field of view provided by unmanned helicopter 100A can be easily controlled by a user. Performance and utility of unmanned helicopter 100A may thus be improved.

Figure 25:
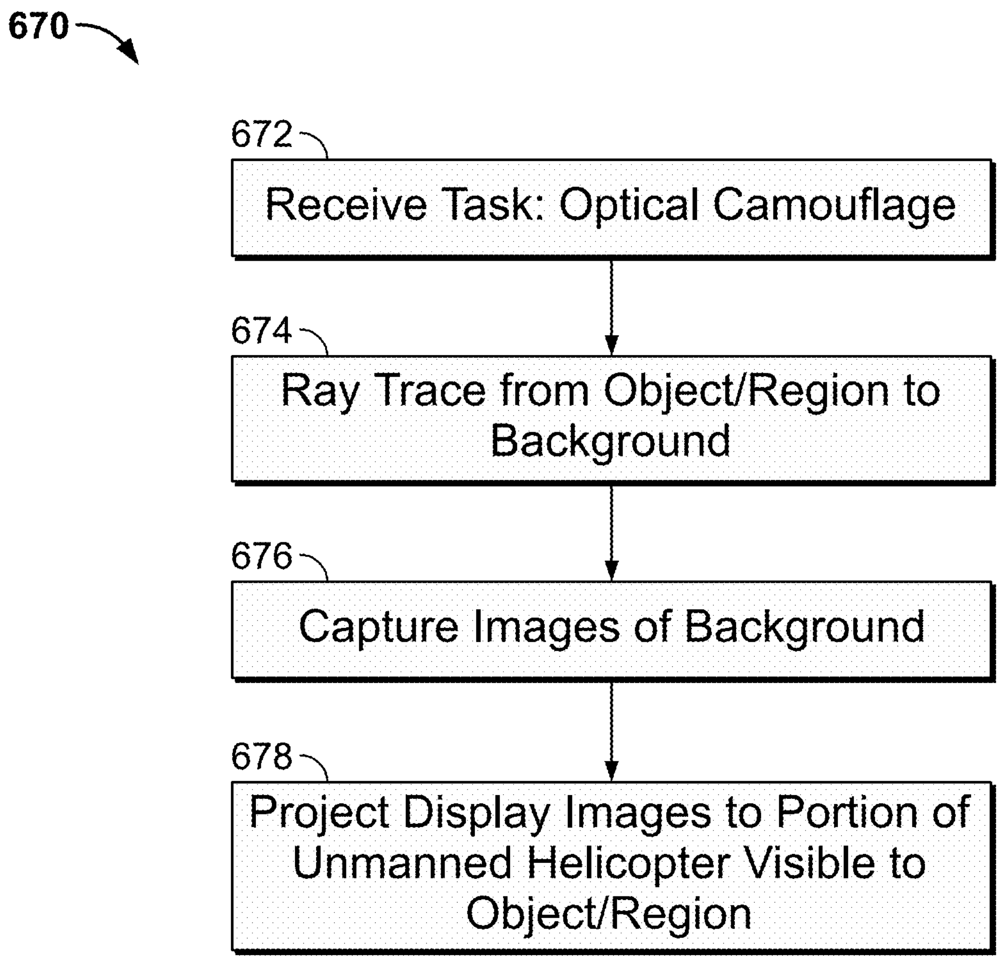
FIG. 25 is a flow chart depicting an exemplary embodiment of a method for autonomously employing optical camouflage using an exemplary embodiment of an unmanned helicopter.

FIG. 25 is a flow chart depicting an exemplary embodiment of method 670 for autonomously employing optical camouflage using an exemplary embodiment of an unmanned helicopter. Method 670 may be viewed as a particular implementation of method 400 for a specific task. For simplicity, method 670 is described in the context of control system 300 and unmanned helicopter 100A. However, method 670 may be used with other control systems and other autonomous unmanned helicopters.

Processor(s) 302 receive a command indicating that unmanned helicopter 100A is to use optical camouflage, via 672. The processor(s) 302 may receive this command while on another mission, such as searching for and following an object in method 420, surveilling a location in method 510, following an object in method 530, patrolling in method 560 and/or remaining acoustically undetectable using method 540. Alternatively, the task may be received prior to launch. In either case, the task received in step 672 may be part of another mission. In some embodiments, the task received may simply be to remain visually undetectable. In such an embodiment, unmanned helicopter 100A may execute method 670, as well as other desired methods such as the methods 540 and 610.

Ray tracing or other mechanism for determining line of sight from the object, through unmanned helicopter 100A to a background is performed, at 674. The background is what the object would see in response to unmanned helicopter 100A not being present. It is determined at 674 what the background is, as well as which portion of unmanned helicopter 100A is visible to the object in place of the background.

Images of the background are captured, in 676. The images captured are substantially real-time video. The images of the background are displayed, substantially in real time, on the region of unmanned helicopter 100A that is visible to the object instead of the background.

Using method 670 and control system 300, unmanned helicopter 100A may autonomously remain concealed while performing other tasks. Consequently, the method 660 may allow unmanned helicopter 100A to better accomplish missions such as surveillance, searches, or following object(s). Performance of unmanned helicopter 100A implementing method 660 may be improved.

Thus various tasks performed by and components used in unmanned helicopter 100, unmanned helicopter 100A, unmanned helicopter 100B, and unmanned helicopter unmanned helicopter 100C have been described. One of ordinary skill in the art will readily recognize that the components and/or methods may be combined in manners not explicitly described herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
an interface configured to:
receive a command to find a stationary location from which to continue surveillance of a moving object using an unmanned helicopter;
a processor; and
a memory coupled to the processor and configured to provide the processor with instructions;
wherein the processor is configured to execute the instructions to:
determine, based on the command, whether the unmanned helicopter is to stay outside a current field of view of the moving object; and
in response to determining that the unmanned helicopter is to stay outside the current field of view of the moving object, determine, based on the current field of view of the moving object, a suitable stationary location outside the current field of view and a route to the suitable stationary location.

2. The system of claim 1, wherein the command to find the stationary location to continue surveillance is received while on an other mission.

3. The system of claim 2, wherein the other mission comprises searching for and following the moving object.

4. The system of claim 2, wherein the other mission comprises surveilling a location.

5. The system of claim 4, wherein surveilling the location comprises remaining acoustically undetectable.

6. The system of claim 4, wherein surveilling the location comprises hiding in a sun.

7. The system of claim 1, wherein the route to the suitable location is selected to reduce visibility during transit.

8. The system of claim 1, wherein the processor is further configured to autonomously traverse the route.

9. The system of claim 1, wherein the route includes landing within a predetermined distance of a selected landing site.

10. The system of claim 9, wherein an other mission is continued after landing.

11. The system of claim 10, wherein the other mission comprises video or audio surveillance of a particular object.

12. The system of claim 1, wherein the command to find the stationary location is in response to conserving power while the moving object being followed remains stationary.

13. The system of claim 12, wherein in response to the moving object starting to move, the unmanned helicopter is configured to take off and continue following the moving object.

14. The system of claim 12, wherein in response to the moving object starting to move, the unmanned helicopter is configured to take off and continue operating.

15. The system of claim 1, wherein the command to find the stationary location is in response to battery power being low.

16. The system of claim 1, wherein the command to find the stationary location is in response to a non-mission critical fault being detected.

17. A method comprising:

receiving a command to find a stationary location from which to continue surveillance of a moving object using an unmanned helicopter;

determining, using a processor and based on the command, whether the unmanned helicopter is to stay outside a current field of view of the moving object; and in response to determining that the unmanned helicopter is to stay outside the current field of view of the moving object, determining, based on the current field of view of the moving object, a suitable stationary location outside the current field of view and a route to the suitable stationary location.

18. A computer program product for controlling an unmanned helicopter, the computer program product being embodied in a non-transitory computer readable storage medium and comprising computer instructions for:

receiving a command to find a stationary location from which to continue surveillance of a moving object using an unmanned helicopter;

determining, using a processor and based on the command, whether the unmanned helicopter is to stay outside a current field of view of the moving object; and in response to determining that the unmanned helicopter is to stay outside the current field of view of the moving object, determining, based on the current field of view of the moving object, a suitable stationary location outside the current field of view and a route to the suitable stationary location.

* * * * *